(12) United States Patent
Rubanovich et al.

(10) Patent No.: US 9,542,154 B2
(45) Date of Patent: Jan. 10, 2017

(54) FUSED MULTIPLY ADD OPERATIONS USING BIT MASKS

(71) Applicants: Simon Rubanovich, Haifa (IL); Thierry Pons, Hadera (IL); Amit Gradstein, Binyamina (IL); Zeev Sperber, Zichron Yaakov (IL)

(72) Inventors: Simon Rubanovich, Haifa (IL); Thierry Pons, Hadera (IL); Amit Gradstein, Binyamina (IL); Zeev Sperber, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 322 days.

(21) Appl. No.: 13/926,175

(22) Filed: Jun. 25, 2013

(65) Prior Publication Data

US 2014/0379773 A1    Dec. 25, 2014

(51) Int. Cl.
*G06F 7/483*    (2006.01)
*G06F 7/544*    (2006.01)
*G06F 7/76*    (2006.01)

(52) U.S. Cl.
CPC ............. *G06F 7/483* (2013.01); *G06F 7/5443* (2013.01); *G06F 7/764* (2013.01)

(58) Field of Classification Search
CPC ........ G06F 7/485; G06F 7/487; G06F 7/4876; G06F 7/5443
See application file for complete search history.

(56) References Cited

U.S. PATENT DOCUMENTS

| 5,530,663 | A  | * | 6/1996 | Garcia et al. | 708/501 |
| 5,751,621 | A  | * | 5/1998 | Arakawa | 708/501 |
| 5,996,066 | A  | * | 11/1999 | Yung | 712/221 |
| 6,571,266 | B1 | * | 5/2003 | Bass | 708/501 |
| 7,499,962 | B2 | * | 3/2009 | Tang et al. | 708/501 |
| 8,239,440 | B2 | * | 8/2012 | Brooks et al. | 708/501 |
| 8,914,430 | B2 | * | 12/2014 | Gradstein et al. | 708/501 |
| 2003/0212726 | A1 | * | 11/2003 | Luick | 708/501 |

* cited by examiner

*Primary Examiner* — Chuong D Ngo
(74) *Attorney, Agent, or Firm* — Lowenstein Sandler LLP

(57) ABSTRACT

Systems and methods of performing a fused multiply add (FMA) operations are provided. In one embodiment, the length of the adder used by the FMA operation is less than 3*N, where N is the number of bits in the mantissa term of a floating point number. A mask may be used to perform the addition portion of the FMA operation using the adder. A second mask may be used to denormalize the result of the addition portion of the FMA operation if an underflow occurs.

18 Claims, 15 Drawing Sheets

FUSED MULTIPLY ADD OPERATIONS USING BIT MASKS

TECHNICAL FIELD

Embodiments described herein generally relate to processing devices and, more specifically, relate to operations on floating point numbers.

BACKGROUND

Processing devices (e.g., processors) may execute instructions when executing applications and/or performing various other functions and operations. As the processing devices execute instructions, the processing device may often perform operations that use floating point numbers. One type of operation that uses floating point numbers is a fused multiply add (FMA) operation. The FMA operation operates on three floating point numbers, A, B, and C. The FMA operation may compute the product of A*B and may add the product to C. For example, the FMA operation may compute (A*B)+C.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

Figure 1:
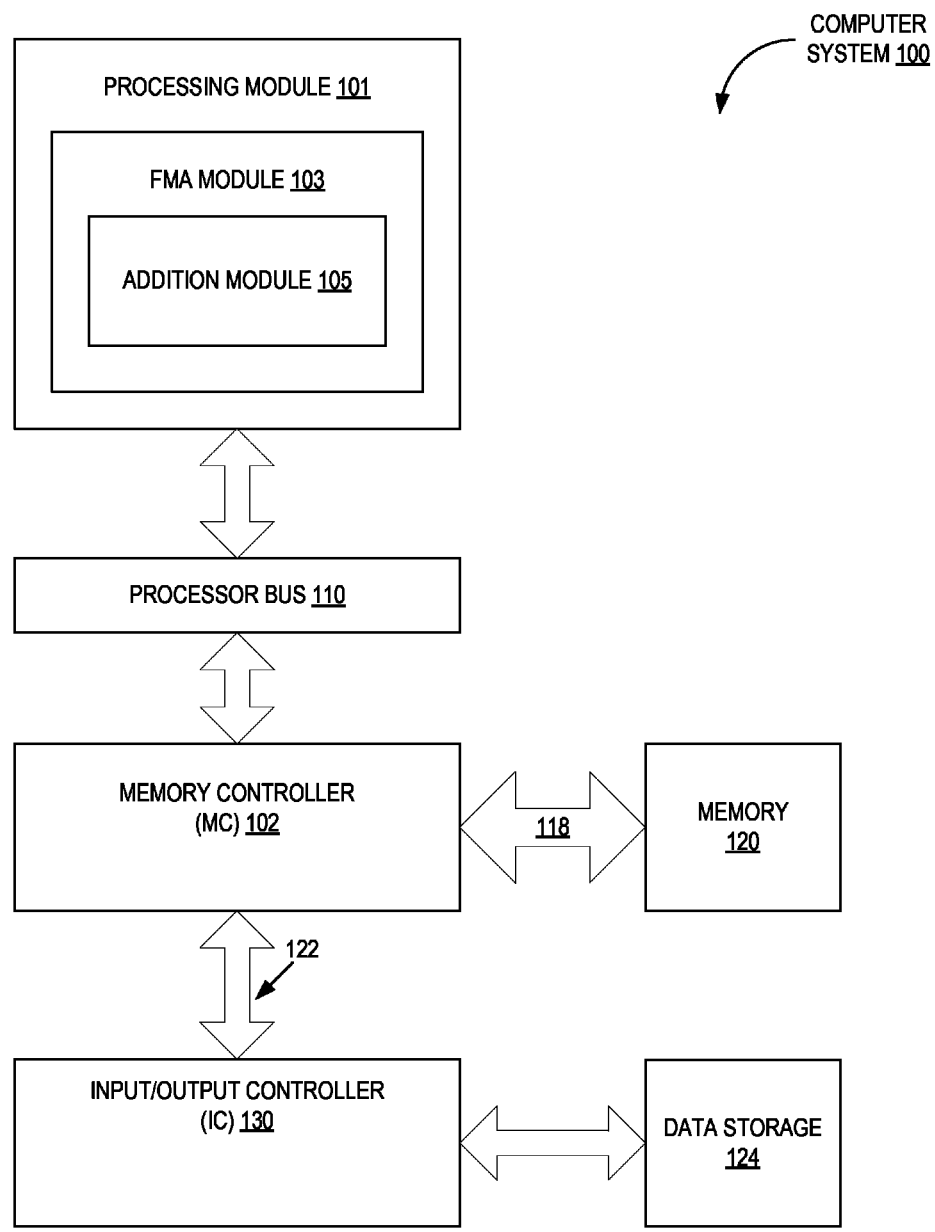
FIG. 1 is a block diagram of a computer system that includes a fused-multiply add module for performing multiplication and addition operations in a general purpose processor, in accordance with an embodiment of the present disclosure.

Many different types of applications, functions, and operations use floating point numbers. For example 3D graphics, multimedia applications, and many processing algorithms may use floating point numbers. A common operation that is performed on floating point numbers may be the FMA operation. For example, many 3D graphics and multiple media applications use the FMA operation. Because operations on floating point numbers often have a high precision range, the adders used to perform the FMA operation are often large. For example, for a 32-bit floating point number, a 69-bit adder may be used to perform the FMA operation. In another example, for a 63-bit floating point number, a 156-bit adder may be used to perform the FMA operation. These large adders may often increase the time required to perform the FMA operation and may increase the power consumption of a processing device.

Embodiments of the disclosure provide for performing the FMA operation with a smaller adder. In one embodiment, the length of the adder is less than 3*N, where N is the number of bits in the mantissa term of a floating point number. A processing device may use a mask to perform the addition portion of the FMA operation using the smaller adder. For example, the processing device may use a mask and an adder that has a length of 2N. The processing device may also determine whether the result of the addition portion of the FMA operation will result in an underflow. If the result of the addition portion of the FMA operation will result in an underflow, the processing device may use a second mask to denormalize the result of the addition portion of the FMA operation.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

FIG. 1 is a block diagram of an exemplary computer system 100 formed with a processor that includes execution units to execute an instruction, where one or more of the components of the computer system 100 implement one or more features in accordance with one embodiment of the present disclosure. Computer system 100 includes a component, such as a processing module 101 to employ execution units including logic to perform algorithms for process data, in accordance with the present invention, such as in the embodiment described herein. Computer system 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments of the present invention can be used in handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In one embodiment, processing module 101 includes one or more execution units to implement an algorithm that is to perform at least one instruction. One embodiment may be described in the context of a single processor desktop or server system, but alternative embodiments may be included in a multiprocessor system. Processing module 101 may execute instructions of one or more applications. The application may be a program, a software module, a software component, and/or other software element that may be executing by the processing module 101. The application may include a plurality of instructions. The instructions may include program code to cause processing module 101 to perform activities such as, but not limited to, reading data, writing data, processing data, formulating data, converting data, transforming data, etc. For example, the application may be a binary file and/or an executable file that includes instructions to cause the processing module to execute a media player to play media items (such as digital videos, digital music) or to cause the processing module to execute a web browser. The instructions in the application may be divided into blocks of instructions (e.g., a series or group of instructions), such as instruction blocks. The instructions and/or instruction blocks of the application may include a variety of different instructions (e.g., program instructions). For example, the instructions and/or instruction blocks may include an ADD instruction (to add two or more values), a MULT instruction (to multiple two or more values), an exclusive-OR (XOR) instruction (to exclusive-or two or more values), an AND instruction (to perform a bit-wise and on two or more values), a store instruction (to store a value in a memory location, such as a register), a JUMP instruction (to direct the flow of execution of the instructions to a particular instruction), a BRANCH instruction (to direct the flow of execution of the instructions to a particular instruction based on one or more conditions, etc.).

The processing module 101, as one illustrative example, may include a complex instruction set computer (CISC) microprocessor, a reduced instruction set computing (RISC) microprocessor, a very long instruction word (VLIW) microprocessor, a multi-core processor, a multithreaded processor, an ultra-low voltage processor, an embedded processor, a processor implementing a combination of instruction sets, and/or any other processor device, such as a digital signal processor, for example. The processing module 101 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processing module 101 may be from another company, such as ARM Holdings, Ltd, MIPS, etc. The processing module 101 may be a special-purpose processor, such as, for example, a network or communication processor, compression engine, graphics processor, co-processor, embedded processor, an application specific integrated circuit (ASIC), a field programmable gate array (FPGA), a digital signal processor (DSP), or the like. The processing module 101 may be implemented on one or more chips. The processing module 101 may be a part of and/or may be implemented on one or more substrates using any of a number of process technologies, such as, for example, BiCMOS, CMOS, or NMOS. The processing module 101 is coupled to a processor bus 110 that transmits data signals between the processing module 101 and other components in the computer system 100.

Memory 120 includes a dynamic random access memory (DRAM) device, a static random access memory (SRAM) device, flash memory device, or other memory device. Memory 120 stores instructions and/or data represented by data signals that are to be executed by the processing module 101. In one embodiment, DRAM may be a type of random-access memory that stores each bit of data in a separate capacitor within an integrated circuit. Examples of DRAM include, but are not limited to, double data rate synchronous RAM (DDR SDRAM), double data rate type 2 synchronous RAM (DDR2 SDRAM), and double data rate type 3 synchronous RAM (DDR3 SDRAM), etc. In another embodiment, SRAM may be a type of memory that uses latching circuitry to store each bit of data. In one embodiment, the memory 120 may be a volatile memory. A volatile memory may be a memory that requires power to maintain the stored data or information. The memory 120 may also be referred to as main memory.

A system logic chip 102 is coupled to the processor bus 110 and memory 120. The system logic chip 102 in the illustrated embodiment is a memory controller (MC). The processing module 101 can communicate to the MC 102 via a processor bus 110. The MC 102 provides a high bandwidth memory path 118 to memory 120 for instruction and data storage and for storage of graphics commands, data and textures. Tin one embodiment, the MC 102 allows the processing module 101 to read and/or write data to the memory 120. The MC 102 is to direct data signals between the processing module 101, memory 120, and other components in the computer system 100 and to bridge the data signals between processor bus 110, memory 120, and system I/O bus 122.

Computer system 100 may use interface bus 122 to couple the MC 102 to the input/output (I/O) controller (IC) 130. The IC 130 provides direct connections to some I/O devices via a local I/O bus. In one embodiment, the local I/O bus may be a high-speed I/O bus for connecting peripherals (e.g., data storage device 124) to the memory 120, chipset, and processing module 101. The data storage device 124 can comprise a hard disk drive, a floppy disk drive, a CD-ROM device, a flash memory device, a mass storage device, and/or any device that may store data.

In one embodiment, the processing module 101 may include a fused multiple add (FMA) module 103. The FMA module 103 may perform a fused multiple add (FMA) operation. The FMA module 103 may accept three input numbers: a multiplicand "A," a multiplier "B," and a third number "C." The FMA operation may multiply the multiplicand "A" and the multiplier "B" to generate and/or compute a product "AB." The FMA operation may also add the product "AB" to the third number "C." The third number may be referred to as an addend. In one embodiment, the FMA operation may also be referred to as a multiply add (MADD) operation. In one embodiment, the input numbers A, B, and C may be floating point numbers. A floating point number may be a value that may be expressed as a mantissa term (e.g., a mantissa) multiplied by an exponent term (e.g., may be expressed in exponential form). For example, the number floating point number "12.345" may be represented as a mantissa term "12345" multiplied by an exponent term "$10^{-3}$" (e.g., $12.345*10^{-3}$) or may be represented as a mantissa term 1.2345 multiplied by an exponent term "$10^{-4}$" (e.g., $12.345*10^{-4}$). In another embodiment, the input numbers A, B, and C, may be floating point numbers represented in a binary format. For example, the numbers A, B, and C, may be represented in the Institute of Electrical and Electronics Engineers (IEEE) 754 format. In other examples, the numbers A, B, and C, may be represented in various other binary formats.

The processing module 101 also includes an addition module 105. The addition module 105 may perform the addition of the third number (e.g., the addend or C) to the product of the first number and the second number (e.g., AB). In one embodiment, the addition module 105 may include an adder (e.g., an arithmetic logic unit (ALU)). In one embodiment, the length of the adder (e.g., the number of bits in the numbers supported by the adder) may be less than 3*N, where "N" is the number of the bits used to represent the mantissa term of one of the three numbers A, B, or C. For example, if the mantissa of the number A is represented using 23 bits, then the length of the adder in the addition module 105 may be less than 69 bits (e.g., the length of the adder may be 46 bits). In another example, if the mantissa of the number A is represented using 53 bits, the length of the adder may be less than 159 bits (e.g., the length of the adder may be 106 bits). In one embodiment, the length of the adder may be 2*N, where "N" is the number of the bits used to represent the mantissa term of one of the three numbers A, B, or C. In other embodiments, the length of the adder may be any number that is less than 3*N.

In one embodiment, the addition module 105 may use a first mask (e.g., a first bit string, a first bit sequence, a first bit number) to perform the addition of the third number (e.g., C) with the product of the first number and the second number (e.g., AB). The first mask and the addition of the third number (e.g., C) with the product of the first number and the second number (e.g., AB) are discussed below in conjunction with FIGS. 2 and 4. In another embodiment, the addition module 105 may use a second mask (e.g., a second bit string, a second bit sequence, a second bit number) to denormalize (e.g., convert the result of the addition to a denormalized number by reducing the exponent of the number to 0) the result of the addition of the third number (e.g., C) with the product of the first number and the second number (e.g., AB) if the result of the addition underflows (e.g., if the result of the addition is a number that is smaller than the than the smallest value representable by the computer system 100 or the processing module 101). The second mask and the denormalization of the result of the addition are discussed below in conjunction with FIGS. 5 and 6.

Figure 2:
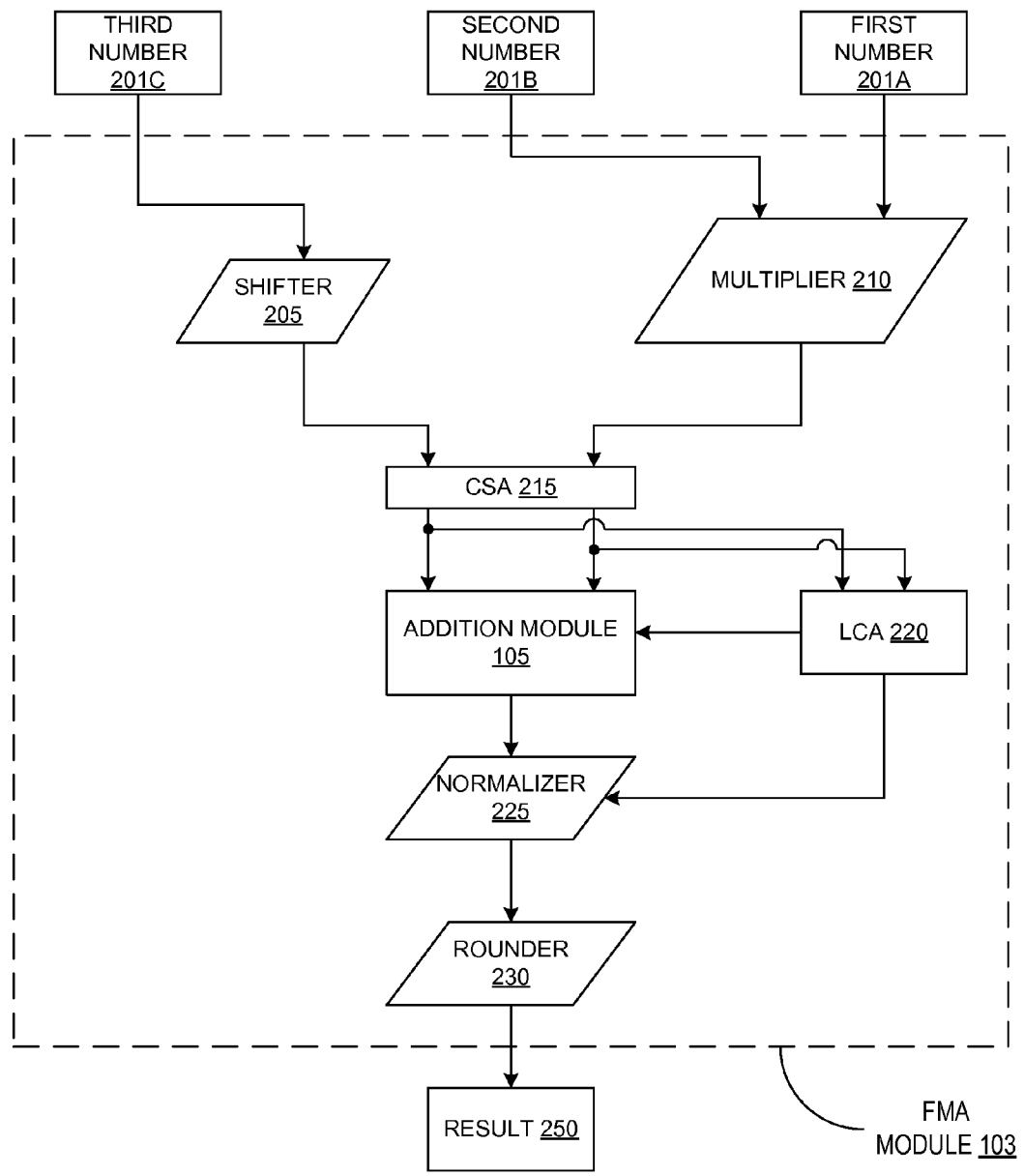
FIG. 2 is a block diagram illustrating a fused multiple add module, according to one embodiment of the present disclosure.

FIG. 2 is a block diagram illustrating a fused multiple add (FMA) module 103, according to one embodiment of the present disclosure. The FMA module 103 includes a shifter 205, a multiplier 210, a carry save adder 215, an addition module 105, a leading change anticipator (LCA) 220, a normalizer 225, and a rounder 230. More or less components may be included in the FMA module 103 without loss of generality. For example, two of the components may be combined into a single component, or one of the components may be divided into two or more components.

The FMA module 103 may receive three inputs, a first number 201A, a second number 201B, and a third number 201C and may compute and/or generate a result 250. In one embodiment, the FMA module 103 may perform a fused multiply add operation (e.g., a MADD operation) using the first number 201A, the second number 201B, and the third number 201C. The FMA module 103 may multiply the first number 201A with the second number 201B to obtain a product number. The FMA module 103 may add the product number to the third number 201C to generate and/or compute the result 250. As discussed above, the first number 201A, the second number 201B, and the third number 201C may be floating point numbers that may be represented in a binary format. Also as discussed above, the first number 201A includes a first mantissa term (e.g., M1) and a first exponent term (e.g., E1), the second number 201B includes a second mantissa term (e.g., M2) and a second exponent term (e.g., E2), and the third number 201C includes a third mantissa term (e.g., M3) and a third exponent term (e.g., E3).

The shifter 205 may be hardware (e.g., circuitry, programmable logic, etc.), software, firmware, or a combination thereof that may shift the bits of the third mantissa term (e.g., M3) to the left or to the right. The shifter 205 may shift the bits of the third mantissa term so that the bits of the third mantissa term are properly aligned with output of the multiplier 210. In one embodiment, the shifter 205 may determine whether the third exponent term is less than the sum of the first exponent term and the second exponent term. For example, the shifter 205 may determine whether E3<E1+E2. If the third exponent term is less than the sum of the first exponent term and the second exponent term (e.g., if E3<E1+E2), the shifter may shift the bits of the third mantissa term (e.g., M3) to the right by (E1+E2)−E3 bits. In one embodiment, the shifter 205 may not shift the bits of the third mantissa term by more than 2*N bits, where N is the number of bits in the third mantissa term. In another embodiment, the shifter 205 may determine whether the third exponent term is greater than the sum of the first exponent term and the second exponent term. For example, the shifter 205 may determine whether E3>E1+E2. If the third exponent term is greater than the sum of the first exponent term and the second exponent term (e.g., if E3>E1+E2), the shifter may shift the bits of the third mantissa term (e.g., M3) to the left by E3−E1−E2 bits. The shifting of bits performed by the shifter 205 is discussed below in more detail in conjunction with FIG. 3.

In one embodiment, the multiplier 210 may be hardware, software, firmware, or a combination thereof that may multiply the first mantissa term (of the first number 201A) with the second mantissa term (of the second number 201B) to compute and/or generate a product number (e.g., a product of the first mantissa term (M1) and the second mantissa term (M2)). For example, the multiplier 210 may be a Wallace tree (e.g., a digital circuit that multiplies two numbers using partial products of the two numbers). In other example, the multiplier 210 may be an ALU.

The output of the shifter 205 and the multiplier 210 are received by CSA 215 and the CSA 215 performs a carry save addition operation using the output of the shifter 205 and the multiplier 210. The output of the CSA 215 is received by the addition module 105. In one embodiment, the addition module 105 may add the product number (e.g., the product of the first mantissa term (M1) and the second mantissa term (M2)) received from the CSA 215 with the third mantissa term (M3) received from the CSA 215. In one embodiment, the addition module 105 may include an adder (e.g., an ALU or a component that performs an addition operation) that has a length of less than 3*N, where N is the number of bits in the mantissa terms M1, M2, and M3. For example, the adder may have a length of 2*N (e.g., the adder may add bit numbers that have a length of 2*N). The addition module 105 may use a first mask (e.g., a bit mask, a bit sequence, etc.) to add the third mantissa term (e.g., M3) with the product number (e.g., the product of the first mantissa term (M1) and the second mantissa term (M2)) to generate a sum, as discussed below in more detail in conjunction with FIG. 4. The addition module 105 may also use a second mask to denormalize the sum if the sum underflows.

The sum of the product number e.g., the product of the first mantissa term (M1) and the second mantissa term (M2)) and the third mantissa term (M3) (that may be shifted by shifter 205) is provided to the normalizer 225. The normalizer 225 may be hardware, software, firmware, or a combination thereof that may normalize a number. The normalizer 225 may normalize the sum and may provide the normalized sum to the rounder 230. In one embodiment, the normalizer 225 may include a priority encoder and a shifter. A priority encoder may be hardware, software, firmware, or a combination thereof that may analyze a bit number or a bit string (e.g., a mask) and may determine whether the bits in the bit number/string should be shifted. For example, the priority encoder may analyze a bit number/string and identify the position of the leftmost (e.g., most significant) "0." If the left most "0" is five bits from the left of the bit string/number, priority encoder may determine that the bit number/string should be shifted left by the five positions. The shifter may be hardware, software, firmware, or a combination thereof that may shift a bit number/bit string right or left. The shifter may add "0" values to the right of the bit string if the bit string is shifted left and may add "0" values to the left of the bit string if the bit string is shifted right. The rounder 230 may round the sum and out the rounded sum as the result 250. In one embodiment (not shown in the figures), the normalizer 225 and/or the rounder 230 may be included in the addition module 105.

Figure 3:
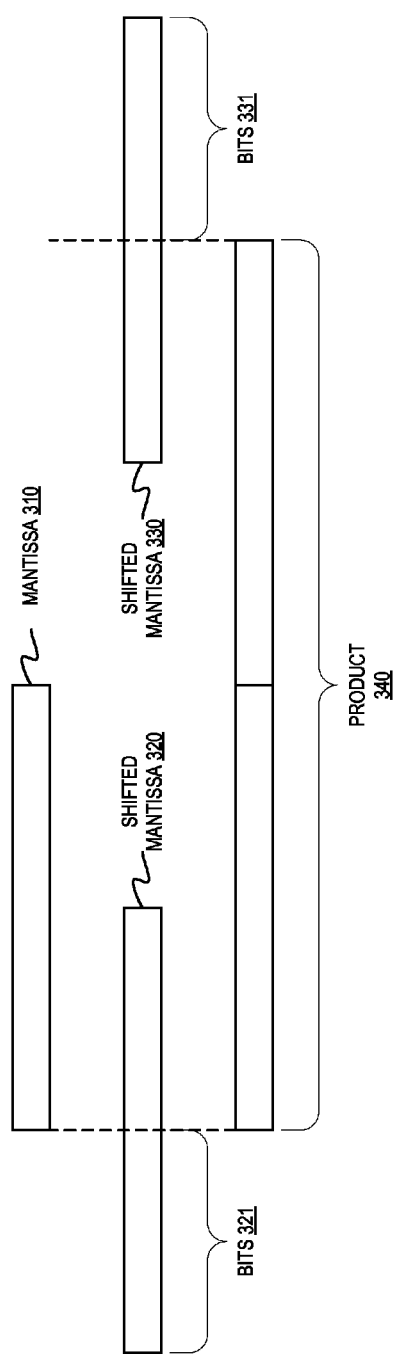
FIG. 3 is a block diagram illustrating exemplary mantissa terms of addends, according to one embodiment of the present disclosure.

FIG. 3 is a block diagram illustrating exemplary mantissa terms of addends, according to one embodiment of the present disclosure. As discussed above in conjunction with FIG. 2, the shifter 205 may shift the bits of the mantissa 310 (which may be the mantissa term of the addend) so that the bits of the mantissa 310 are properly aligned with product 340. Referring back to FIG. 2, the shifter 205 may determine whether a third exponent term (E3) is less than the sum of the first exponent term (E1) and the second exponent term (E2). If E3<E1+E2 mantissa 310 is shifted to the right by (E1+E2)−E3 bits, as illustrated by shifted mantissa 330. In one embodiment, the bits 331 that are not within the window (e.g., the left and right boundary) of the product 340 may be discarded. Also back to FIG. 2, the shifter 205 may determine whether a third exponent term (E3) is greater than the sum of the first exponent term (E1) and the second exponent term (E2). If E3>E1+E2 mantissa 310 is shifted to the left by E3−E1−E2 bits, as illustrated by shifted mantissa 320. In one embodiment, the bits 321 that are not within the window (e.g., the left and right boundary) of the product 340 may be discarded.

Figure 4:
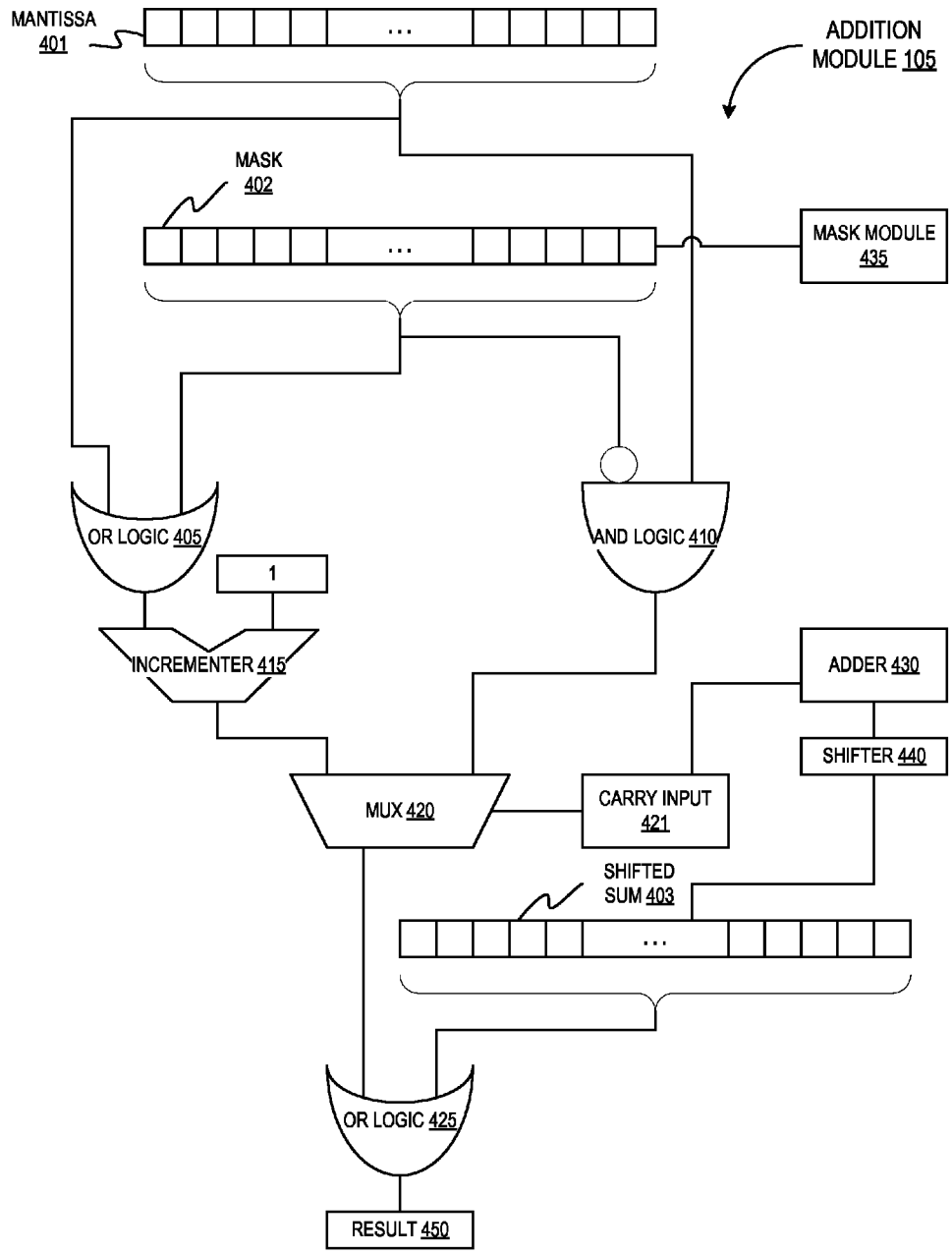
FIG. 4 is a block diagram illustrating an addition module, according to one embodiment of the present disclosure.

FIG. 4 is a block diagram illustrating an addition module 105, according to one embodiment of the present disclosure. The addition module 105 includes OR logic 405, AND logic 410, an incrementer 415, a multiplexer (MUX) 420, OR logic 425, and adder 430, a mask module 435, and a shifter 440. More or less components may be included in the addition module 105 without loss of generality. For example, two of the components may be combined into a single component, or one of the components may be divided into two or more components. The addition module 105 may be used by an FMA module (e.g., as illustrated in FIGS. 1 and 2) when performing a fused multiply add operation on three numbers, A, B, or C (e.g., to perform the operation (A*B)+C). As discussed above, the first number A has a first mantissa term (e.g., M1) and a first exponent term (e.g., E1), the second number A has a second mantissa term (e.g., M2) and a second exponent term (e.g., E2), and the third number A has a third mantissa term (e.g., M3) and a third exponent term (e.g., E3).

In one embodiment, the mantissa 401 and the mask 402 are provided to the OR logic 405. The mantissa 401 may be the mantissa term for the addend (e.g., the number C) in the fused multiply add operation. In one embodiment, the mask 402 may be a bit string, a bit sequence, and/or a bit number. The mask 402 may include "0" values for the high (e.g., left or most significant) E3−E2−E3 bits of the mask 402. The remaining bits of the mask 402 may include "1" values. The OR logic 405 may be hardware (such as an OR gate) that may perform a logical OR operation on the mantissa 401 and the mask 402. The output of the OR logic 405 is provided to the incrementer 415. The incrementer 415 may increment the output of the OR logic 405 by a "1" (e.g., may add "1" to the output of the OR logic 405). The incremented value is provided to the MUX 420. The mantissa 401 and the mask 402 are also provided to the AND logic 410. The mask 402 is inverted (e.g., the NOT operation is performed on the bits of the mask 402) before it is provided to the AND logic 410. The AND logic 410 may be hardware (such as an AND gate) that may perform a logical AND operation on the mantissa 401 and the inversion of the mask 402. The output of the AND logic 410 is provided to the MUX 420.

In one embodiment, the mask module 435 may be hardware (e.g., circuitry, programmable logic, etc.), software, firmware, or a combination thereof that may generate the mask 402. The mask module 435 may also generate an additional mask that may be used by an LCA (e.g., LCA 220 illustrated in FIG. 2). The additional mask and the LCA are discussed in more detail below in conjunction with FIGS. 5 and 6.

The adder 430 may be hardware (e.g., circuitry, programmable logic, etc.), software, firmware, or a combination thereof that may add two numbers together. For example, the adder 430 may be an ALU. In one embodiment, the adder 430 may add the product of the first mantissa term (e.g., M1) and the second mantissa term (e.g., M2), with the shifted third mantissa term (e.g., M3) to compute and/or generate a sum. The third mantissa term (e.g., M3) may be to the left as discussed above in conjunction with FIG. 3. The adder 430 may provide the sum to the shifter 440. The adder 430 may also determine whether the sum results in a carry. If the sum results in a carry, the adder 430 may set the carry input 421 to a "1" value (or some other value indicating that the sum results in a carry). If the sum does not result in a carry, the adder 430 may set the carry input 421 to a "0" value (or some other value indicating that the sum does not result in a carry).

In one embodiment, the MUX 420 may provide the input from the incrementer 415 to the OR logic 425 or the input from the AND logic 410 based on the carry input 421. If the carry input is "1" (or some other value indicating that the sum results in a carry), the MUX 420 may provide the input from the incrementer 415 to the OR logic 425. If the carry input is "1" (or some other value indicating that the sum results in a carry), the MUX 420 may provide the input from the incrementer 415 to the OR logic 425.

The shifter 440 may be hardware, software, firmware, or a combination thereof that may shift a bit sequence to the left or to the right. The shifter 440 may receive the sum from the adder 430 and may obtain the high (e.g., left or most significant) N bits of the sum, where N is the number of bits in one or more of the mantissa terms (e.g., the number of bits in M1, M2, or M3). The shifter 440 may discard the lower (e.g., the right or least significant) N bits of the sum. The shifter 440 may also right shift the high N bits of the sum by E3−E1−E2 bits and may add "0" values to the left of the sum as the high N bits are shifted towards the right. Any bits that are shifter towards the right and that do not fit within a window of "N" bits are discarded. For example, the adder 430 may output a sum that has 46 bits. The shifter 440 may take the high (e.g., left or more significant) 23 bits of the sum and discard the lower (e.g., right or least significant) 23 bits of the sum. The shifter 440 may right shift the high 23 bits to the right by E3−E1−E2 bits and add zeros to the front of the high 23 bits. In one example, if E3−E1−E2 equals 8, the shifter 440 may shift the high 23 bits to the right by 8 bits and add 8 "0" values to the front of the higher 23. The shifter 440 may discard the lower 8 bits of the high N bits. This shifter 440 provides the shifted sum 403 to the OR logic 425.

The OR logic 425 may be hardware (such as an OR gate) that may perform a logical OR operation on the output of the MUX 420 and the shifted sum 403 to produce the result 450. The result 450 may be the sum of product (e.g., A*B) of the first number A and the second number B, and the third number C (e.g., may be the sum resulting from the operation (A*B)+C).

Figure 5:
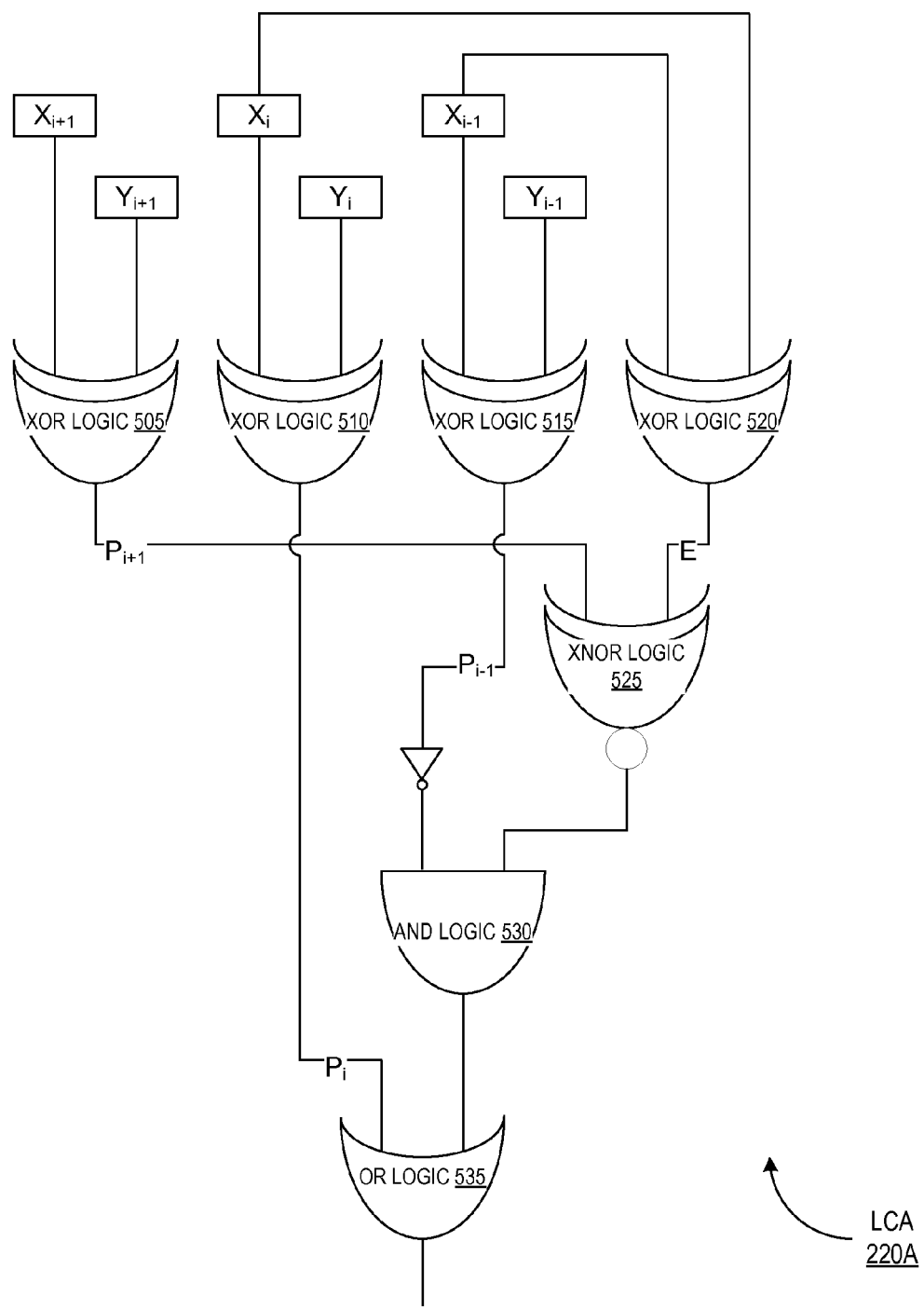
FIG. 5 is a block diagram illustrating an LCA, according to one embodiment of the present disclosure.

FIG. 5 is a block diagram illustrating an LCA 220A, according to one embodiment of the present disclosure. The LCA 220A includes XOR logic 505, XOR logic 510, XOR logic 515, XOR logic 520, XNOR logic 525, AND logic 530, and OR logic 535. XOR logics 505, 510, 515, and 520 may be hardware (such as an XOR gate) that may perform a logical XOR operation. XNOR logic 525 may be hardware (such as an XNOR gate) that may perform a logical XNOR operation. AND logic 530 may be hardware (such as an AND gate) that may perform a logical AND operation. OR logic 535 may be hardware (such as an OR gate) that may perform a logical OR operation. As discussed above in conjunction with FIG. 2, an FMA module may perform an FMA operation such as (A*B)+C using an addition module. In one embodiment, the sum of (A*B) and C may result in an underflow and addition module may denormalize the sum of (A*B) and C. The addition module may use the LCA 220A to denormalize the sum of (A*B) and C.

In one embodiment, the LCA 220A may generate a bit mask (e.g., an LCA mask). The LCA bit mask may have N bits, where N is the number of bits in the mantissa terms of the numbers A, B, or C. The LCA 220A may generate the LCA mask bit by bit. When generating a bit of the LCA mask (e.g., LCA[i]) where "i" is the position of the bit that is being generated), the LCA 220A may use the mantissa terms of A and B. Each bit of the LCA mask is generated by providing the bits $X_{i+1}$, $X_i$, $X_{i-1}$ $Y_{i+1}$, $Y_i$, and $Y_{i-1}$ to the LCA 220A. The LCA 220A uses the bits $X_{i+1}$, $X_i$, and $X_{i-1}$ of the mantissa term of the number A and uses the bits $Y_{i+1}$, $Y_i$, and $Y_{i-1}$ of the mantissa term of the number B. For example, when calculating the $4^{th}$ bit of the LCA mask, the LCA 220A uses the $3^{rd}$, $4^{th}$, and $5^{th}$ bit of the mantissa term of the number A and uses the $3^{rd}$, $4^{th}$, and $5^{th}$ bit of the mantissa term of the number B. The XOR logic 505 performs an XOR operation on the bits $X_{i+1}$ and $Y_{i+1}$ to generate the result $P_{i+1}$. The XOR logic 510 performs an XOR operation on the bits $X_i$ and $Y_i$ to generate the result $P_i$. The XOR logic 515 performs an XOR operation on the bits $X_{i-1}$ and $Y_{i-1}$ to generate the result $P_{i-1}$. The XOR logic 520 performs an XOR operation on the bits $X_i$ and $X_{i-1}$ to generate the result E. The XNOR logic performs the XNOR operation on the result $P_{i-1}$ and the result E. The AND logic 530 performs the AND operation on the inverse of the result $P_{i-1}$ and output of the XNOR logic 525. The OR logic 535 performs the OR operation on the result $P_{i+1}$ and the output of the AND logic 530 to generate a bit for the LCA mask.

After generating the LCA mask, the LCA 220A may perform a logical AND operation using the LCA mask and a separate mask received from the addition module to generate a resulting mask. The addition module may generate the separate mask and may provide the separate mask to the LCA 220A. In one embodiment, the separate mask may have N bits, where N is the number of bits in the mantissa terms of the numbers A, B, or C. In one embodiment, a number of the most significant bits of the mask (e.g., a number of the leftmost bits) have the value "1" and the remaining bits of the separate mask have the value "0." In one embodiment, the number of the most significant bits in the mask may be determined using the following equation: max ((E1+E2), E3), where E1 is the exponent of the value A, E2 is the exponent of the value B, E3 is the exponent of the value E3, and max( ) obtains the highest of two values (e.g., determines which of (E1+E2) or E3 is larger and obtains the larger value). After performing the logical AND operation, the FMA module may analyze the resulting mask and determine the highest (e.g., most significant or leftmost) position in the resulting mask that has the value "0." For example, the FMA module may analyze the resulting mask starting from the left most bit and move towards the right until the first "0" value is found. The FMA module may shift the result computed and/or generated by the addition module (e.g., result 450 illustrated in FIG. 4) based on the position where the first "0" value is found. For example, if the first "0" appears in the $2^{nd}$ position from the left of the resulting mask, the FMA module may shift the result computed and/or generated by the addition module towards the left by 2 positions. The values which are shifted left and do not fit within the window (e.g., size) of the result are discarded and new "0" values are shifted into the result on the right side. For example, if the result was "11001010" and the first "0" appears in the $2^{nd}$ position from the left of the resulting mask, the result may be left shifted by two positions, the "11" may be discarded, and the value "00" may be added to the right side of the result. The value of the result after the shift may be "00101000."

In one embodiment, the resulting mask is used to denormalize the result of the addition module if an underflow occurs when the additional module performs an addition. By shifting the result of the addition module by a number of positions equal to the position where the first "0" value is found in the resulting mask (starting from the left or most significant bits), the result of the addition module is denormalized. In another embodiment, the resulting mask may be used to shift the result of the addition module regardless of whether or not the result of the addition results in an underflow. As discussed above, the resulting mask is obtained by performing a logical AND operation on the LCA mask and the separate mask received from the addition module. When the addition does not result in an underflow, the leftmost "0" of the separate mask is to the right of the leftmost "0" of LCA mask. The position of the leftmost "0" value in the LCA mask will be the same as the position of leftmost "0" value of the resulting mask and the resulting mask may be used to normalize the result of the addition (e.g., to shift the result of the addition). When the addition does result in an underflow, leftmost "0" of the separate mask is to the left of leftmost "0" of LCA mask. The position of the leftmost "0" value in the separate mask will be the same as the position of the leftmost "0" value of the resulting mask and the resulting mask may be used to denormalize the result of the addition (e.g., to shift the result of the addition). Thus, the separate mask will not affect the shifting of the result of the addition if an underflow does not occur. The resulting mask allows the addition module to normalize and/or denormalize the result of the addition in one operation. For example, instead first performing a normalization and then a denormalization, both the normalization and the denormalization may be performed in one operation because the resulting mask is generated using the LCA mask (which is used for normalization) and the separate mask (which is used for denormalization).

Figure 6:
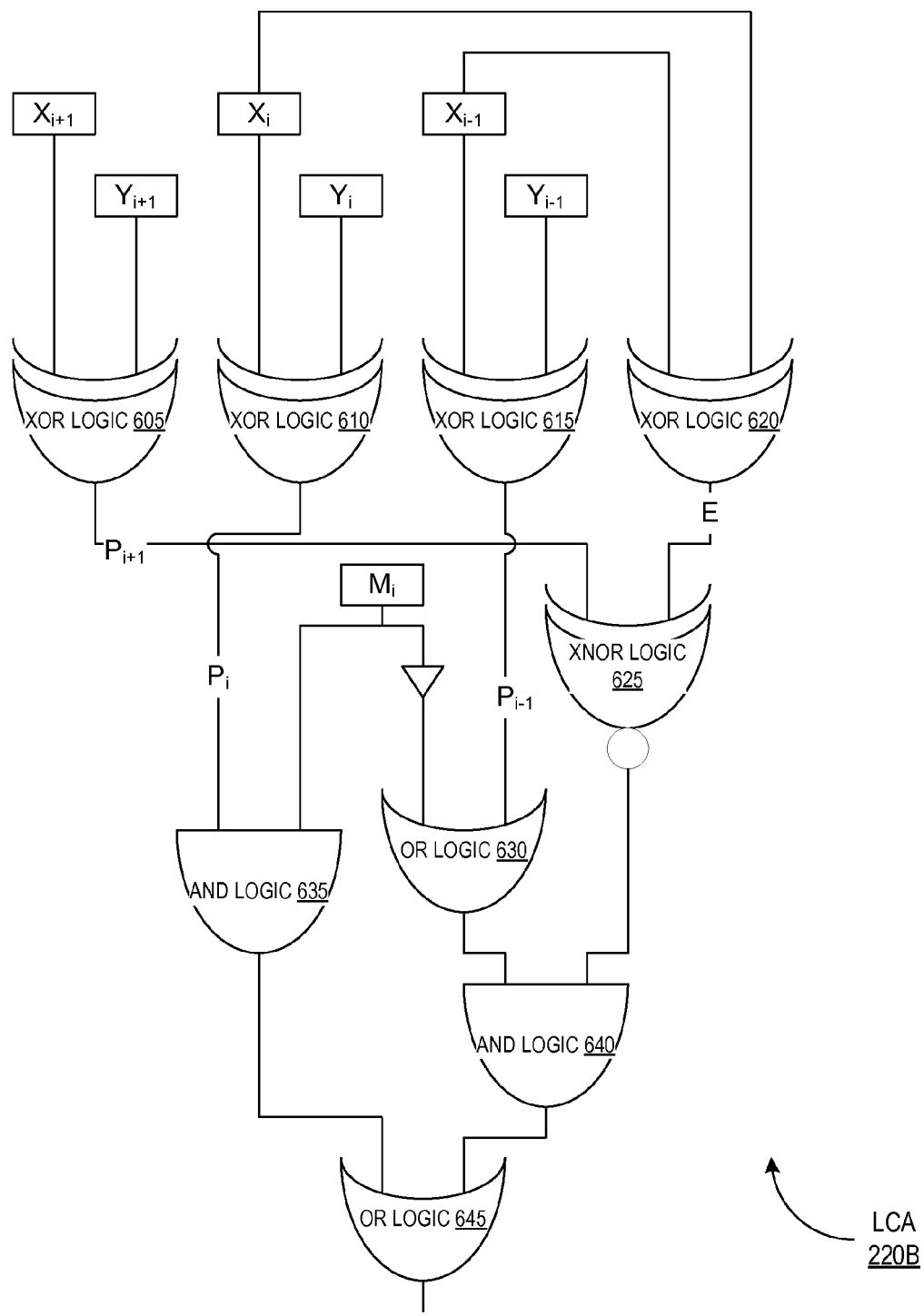
FIG. 6 is a block diagram illustrating an LCA, according to another embodiment of the present disclosure.

FIG. 6 is a block diagram illustrating an LCA 220B, according to another embodiment of the present disclosure. The LCA 220B includes XOR logic 605, XOR logic 610, XOR logic 615, XOR logic 620, XNOR logic 625, OR logic 630, AND logic 635, AND logic 640, and OR logic 645. XOR logics 605, 610, 615, and 620 may be hardware (such as an XOR gate) that may perform a logical XOR operation. XNOR logic 625 may be hardware (such as an XNOR gate) that may perform a logical XNOR operation. AND logics 635 and 640 may be hardware (such as an AND gate) that may perform a logical AND operation. OR logic 645 may be hardware (such as an OR gate) that may perform a logical OR operation. As discussed above in conjunction with FIG. 2, an FMA module may perform an FMA operation such as (A*B)+C using an addition module. In one embodiment, the sum of (A*B) and C may result in an underflow and addition module may denormalize the sum of (A*B) and C. The addition module may use the LCA 220B to denormalize the sum of (A*B) and C.

In one embodiment, the LCA 220B may generate a bit mask (e.g., an LCA mask). The LCA bit mask may have N bits, where N is the number of bits in the mantissa terms of the numbers A, B, or C. The LCA 220B may generate the LCA mask bit by bit. When generating a bit of the LCA mask (e.g., LCA[i] where "i" is the position of the bit that is being generated), the LCA 220B may use the mantissa terms of A and B. Each bit of the LCA mask is generated by providing the bits $X_{i+1}$, $X_i$, $X_{i-1}$ $Y_{i+1}$, $Y_i$, and $Y_{i-1}$ to the LCA 220B. The LCA 220B uses the bits $X_{i+1}$, $X_i$, and $X_{i-1}$ of the mantissa term of the number A and uses the bits $Y_{i+1}$, $Y_i$, and $Y_{i-1}$ of the mantissa term of the number B. For example, when calculating the $4^{th}$ bit of the LCA mask, the LCA 220B uses the $3^{rd}$, $4^{th}$, and $5^{th}$ bit of the mantissa term of the number A and uses the $3^{rd}$, $4^{th}$, and $5^{th}$ bit of the mantissa term of the number B. As illustrated in FIG. 6, the LCA 220B also uses a separate mask received from the addition module when computing the LCA mask. The LCA 220B uses the bit $M_i$ where "i" is the position of the bit that is being generated. For example, if the LCA 220B is generating the $3^{rd}$ bit of the LCA mask, the $3^{rd}$ bit of the separate mask is used. This may allow the FMA module to directly use the LCA mask received from the LCA 220B instead of performing the AND operation on the LCA mask and the separate mask received from the addition module to generate a resulting mask (as discussed above in conjunction with FIG. 5).

The XOR logic 605 performs an XOR operation on the bits $X_{i+1}$ and $Y_{i+1}$ to generate the result $P_{i+1}$. The XOR logic 610 performs an XOR operation on the bits $X_i$ and $Y_i$ to generate the result $P_i$. The XOR logic 615 performs an XOR operation on the bits $X_{i-1}$ and $Y_{i-1}$ to generate the result $P_{i-1}$. The XOR logic 620 performs an XOR operation on the bits $X_i$ and $X_{i-1}$ to generate the result E. The XNOR logic 625 performs the XNOR operation on the result $P_{i+1}$ and the result E. The OR logic 630 performs the XOR operation on the inverse of $M_i$ and the result $P_{i-1}$. The AND logic 635 performs the AND operation on the value $M_i$ and the result $P_i$. The AND logic 640 performs the AND operation on the output of OR logic 630 and XNOR logic 625. The OR logic 645 performs the OR operation on the output of the AND logic 635 and the AND logic 640.

After the LCA 220B generates the LCA mask, the FMA module may analyze the LCA mask and determine the highest (e.g., most significant or leftmost) position in the LCA mask that has the value "0." For example, the FMA module may analyze the LCA mask starting from the left most bit and move towards the right until the first "0" value is found. The FMA module may shift the result computed and/or generated by the addition module (e.g., result 450 illustrated in FIG. 4) based on the position where the first "0" value is found. The values which are shifted left and do not fit within the window (e.g., size) of the result are discarded and new "0" values are shifted into the result on the right side. In one embodiment, the LCA mask is used to denormalize the result of the addition module if an underflow occurs when the additional module performs an addition. By shifting the result of the addition module by a number of positions equal to the position where the first "0" value is found in the LCA mask (starting from the left or most significant bits), the result of the addition module is denormalized.

In one embodiment, the LCA mask that is generated by the LCA 220B may be the same as the resulting mask discussed above in conjunction with FIG. 5. Similarly, the LCA mask may be used to shift the result of the addition module regardless of whether or not the result of the addition results in an underflow. The LCA mask will not affect the shifting of the result of the addition if an underflow does not occur. The LCA mask allows the addition module to normalize and/or denormalize the result of the addition in one operation. For example, instead first performing a normalization and then a denormalization, both the normalization and the denormalization may be performed in one operation.

Figure 7:
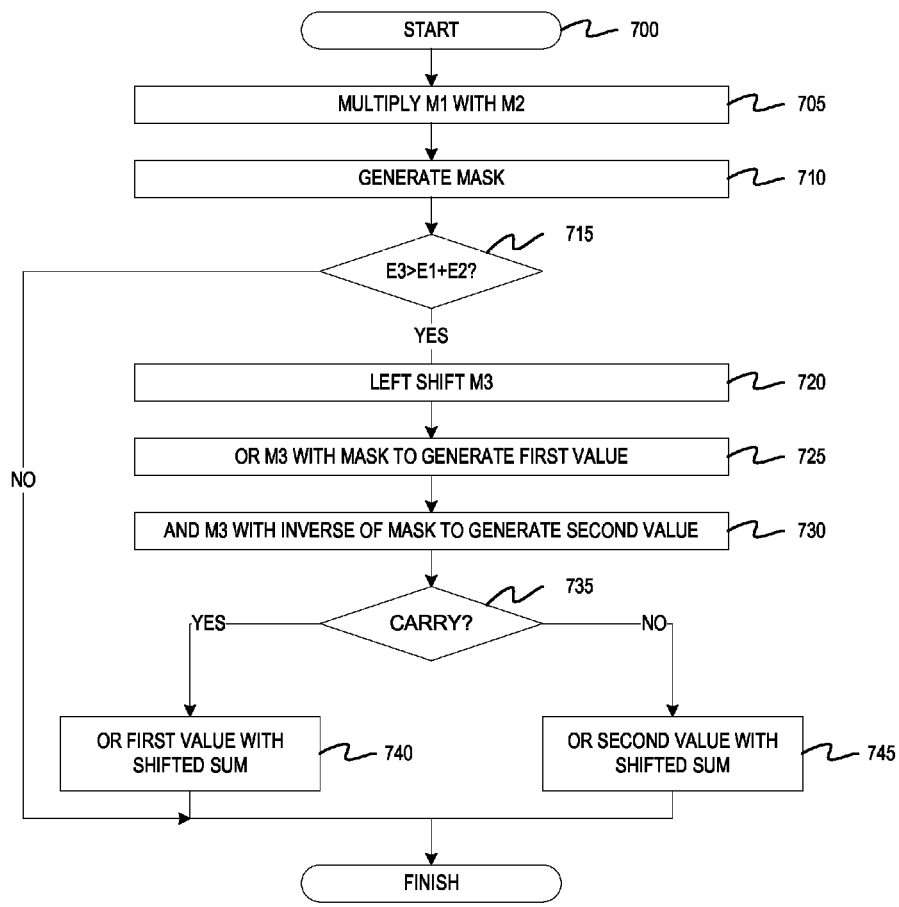
FIG. 7 is a flow diagram illustrating a method of performing an FMA operation, according to one embodiment of the present disclosure.

FIG. 7 is a flow diagram illustrating a method 700 of performing an FMA operation, according to one embodiment of the present disclosure. Method 700 may be performed by processing logic that may comprise hardware (e.g., circuitry, dedicated logic, programmable logic, microcode, etc.), software (such as instructions run on a processing device), firmware, or a combination thereof. In one embodiment, method 700 may be performed by an FMA module, as illustrated in FIGS. 1 and 2. For simplicity of explanation, the method 700 is depicted and described as a series of acts. However, acts in accordance with this disclosure can occur in various orders and/or concurrently and with other acts not presented and described herein. Furthermore, not all illustrated acts may be required to implement the method 700 in accordance with the disclosed subject matter. In addition, those skilled in the art will understand and appreciate that the method 700 could alternatively be represented as a series of interrelated states via a state diagram or events. In one embodiment, the method 700 may perform a fused multiply add operation on the numbers A, B, and C (e.g., may perform the operation (A*B)+C). The number A may have an exponent term E1 and a mantissa term M1. The number B may have an exponent term E2 and a mantissa term M2. The number C may have an exponent term E3 and a mantissa term M3.

Referring to FIG. 7, the method 700 begins at block 705 where the processing logic multiples the mantissa term M1 with the mantissa term M2. At block 710, the processing logic generates a mask (e.g., as described above in conjunction with FIGS. 1-4). The processing logic determines whether E3>E1+E2 at block 715. If E3 is not greater than E1+E2, the method 700 ends. If E3 is greater than E1+E2, the processing logic proceeds to block 720 where M3 is left shifted by E3−E1−E2 bits. The processing logic performs an OR operation on the mantissa term M3 with the mask to generate a first value (block 725). The processing logic also performs the AND operation on the mantissa term M3 with the inverse of the mask to generate a second value (block 730). At block 735, the processing logic determines whether the sum resulting from addition of the product M1*M2 and M3 will result in a carry. If the addition results in a carry, the processing logic proceeds to block 740 where the processing logic shifts the sum (as discussed above in conjunction with FIG. 4) and performs the OR operation on the first value and the shifted sum to produce a result value. After block 740, the method 700 ends. If the addition does not result in a carry, the processing logic proceeds to block 745 where the processing logic shifts the sum (as discussed above in conjunction with FIG. 4) and performs the OR operation on the second value and the shifted sum to produce a result value. After block 745, the method 700 ends.

Figure 8:
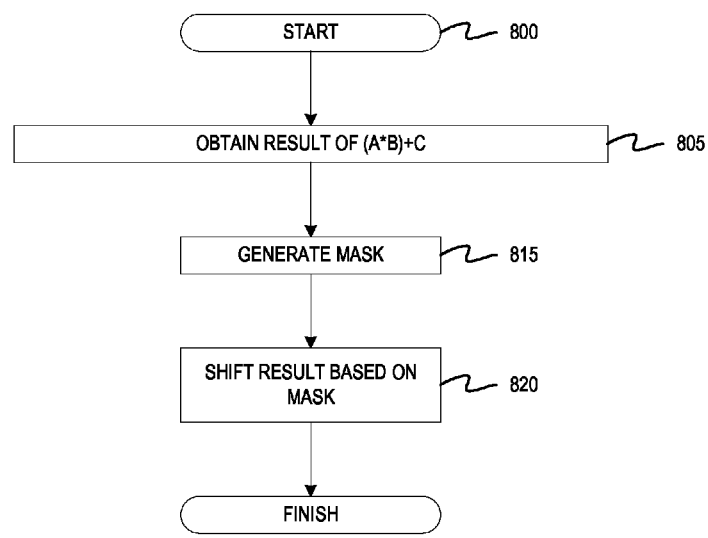
FIG. 8 is a flow diagram illustrating a method of performing an FMA operation, according to another embodiment of the present disclosure.

FIG. 8 is a flow diagram illustrating a method 800 of performing an FMA operation, according to another embodiment of the present disclosure. Method 800 may be performed by processing logic that may comprise hardware (e.g., circuitry, dedicated logic, programmable logic, microcode, etc.), software (such as instructions run on a processing device), firmware, or a combination thereof. In one embodiment, method 800 may be performed by an FMA module, as illustrated in FIGS. 1 and 2. For simplicity of explanation, the method 800 is depicted and described as a series of acts. However, acts in accordance with this disclosure can occur in various orders and/or concurrently and with other acts not presented and described herein. Furthermore, not all illustrated acts may be required to implement the method 800 in accordance with the disclosed subject matter. In addition, those skilled in the art will understand and appreciate that the method 800 could alternatively be represented as a series of interrelated states via a state diagram or events. In one embodiment, the method 800 may be performed as part of a fused multiply add operation on the numbers A, B, and C (e.g., may perform the operation (A*B)+C). The number A may have an exponent term E1 and a mantissa term M1. The number B may have an exponent term E2 and a mantissa term M2. The number C may have an exponent term E3 and a mantissa term M3.

Referring to FIG. 8, the method 800 begins at block 805 where the processing logic obtains the result of the operation (A*B)+C. At block 815 the processing logic generates a mask (as discussed above in conjunction with FIGS. 5 and 6). At block 820, the processing logic shifts the result based on the mask (as discussed above in conjunction with FIGS. 5 and 6). For example, the processing logic may identifier a position of the leftmost (e.g., most significant) "0" value in the mask and may determine the number of positions from the left where the leftmost "0" is located. The processing logic may left shift the result by the number of positions. In one embodiment, the left shifting may normalize the result when no underflow occurs. In another embodiment, the left shifting may denormalize the result when an underflow occurs. After block 820, the method 800 ends.

Figure 9:
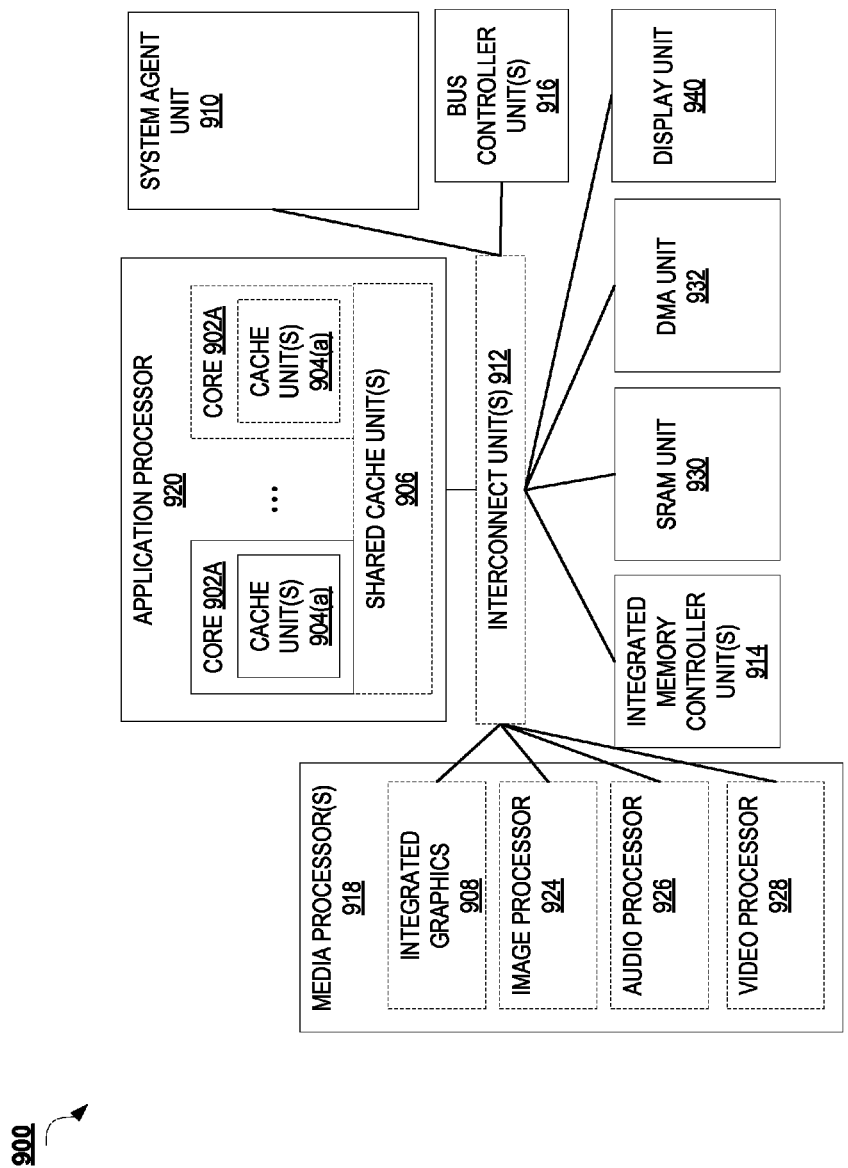
FIG. 9 is a block diagram of a system on chip (SoC), in accordance with an embodiment of the present disclosure.

FIG. 9 is a block diagram of a SoC 900 in accordance with an embodiment of the present disclosure. Dashed lined boxes are optional features on more advanced SoCs. In FIG. 9, an interconnect unit(s) 912 is coupled to: an application processor 920 which includes a set of one or more cores 902A-N and shared cache unit(s) 906; a system agent unit 910; a bus controller unit(s) 916; an integrated memory controller unit(s) 914; a set or one or more media processors 918 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays. In one embodiment, the SoC 900 may include an FMA module (as illustrated in FIGS. 1 and 2) for performing FMA operations.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof.

In some embodiments, one or more of the cores 902A-N are capable of multithreading.

The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture and/or instruction set. For example, some of the cores 902A-N may be in order while others are out-of-order. As another example, two or more of the cores 902A-N may be capable of execution the same instruction set, while others may be capable of executing only a subset of that instruction set or a different instruction set.

The application processor 920 may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the application processor 920 may be from another company, such as ARM Holdings, Ltd, MIPS, etc. The application processor 920 may be a special-purpose processor, such as, for example, a network or communication processor, compression engine, graphics processor, co-processor, embedded processor, or the like. The application processor 920 may be implemented on one or more chips. The application processor 920 may be a part of and/or may be implemented on one or more substrates using any of a number of process technologies, such as, for example, BiCMOS, CMOS, or NMOS.

Figure 10:
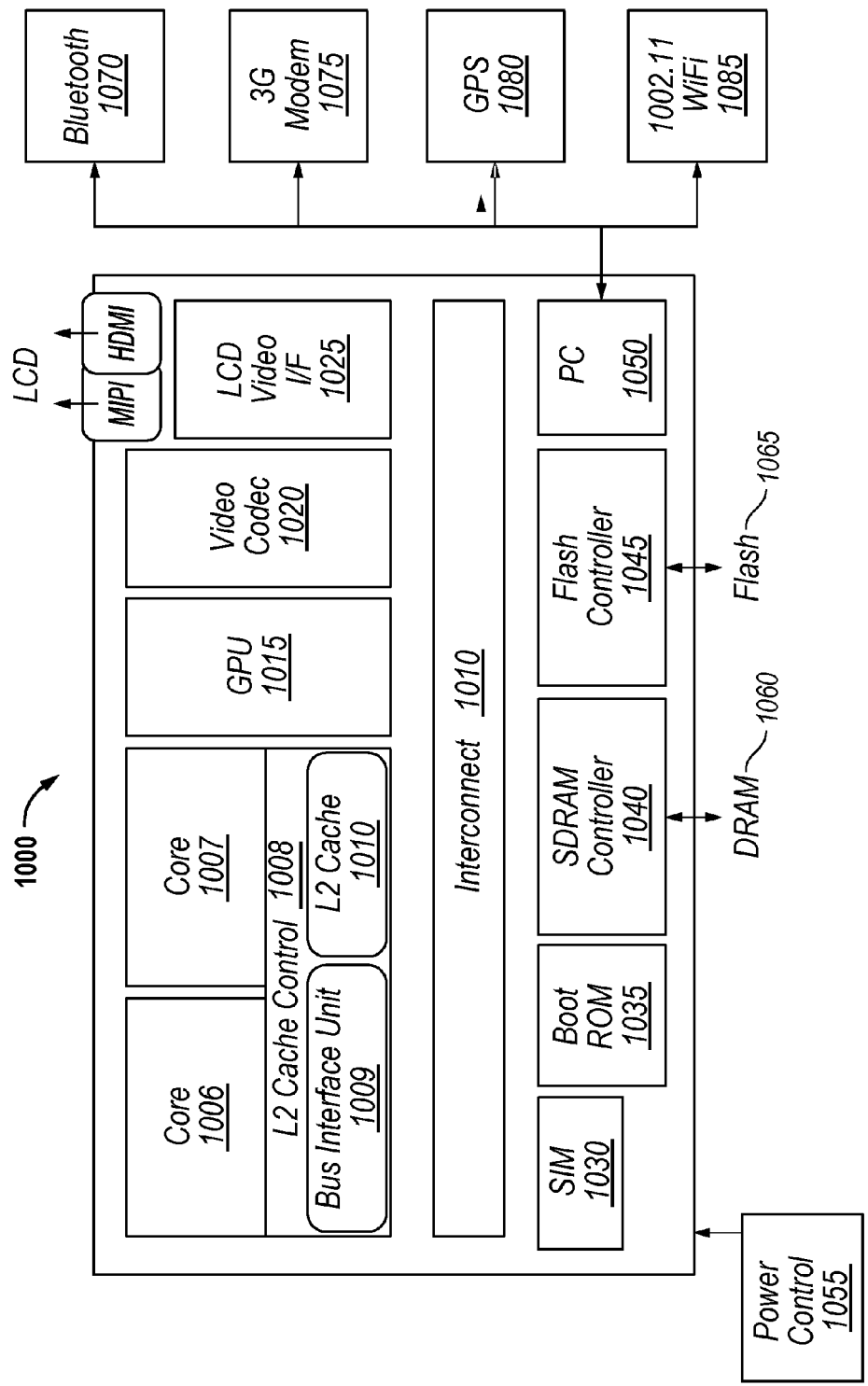
FIG. 10 is a block diagram of an embodiment of a system on-chip (SOC) design, in accordance with another embodiment of the present disclosure.

FIG. 10 is a block diagram of an embodiment of a system on-chip (SOC) design in accordance with the present disclosure. As a specific illustrative example, SOC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1000 includes 2 cores—1006 and 1007. Cores 1006 and 1007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of SoC 1000. Interconnect 1010 includes an on-chip interconnect, such as an IOSF, AMBA, or other interconnect discussed above, which potentially implements one or more aspects of the described disclosure. In one embodiment, the SoC 1000 may include an FMA module (as illustrated in FIGS. 1 and 2) for performing FMA operations.

Interface 1010 provides communication channels to the other components, such as a Subscriber Identity Module (SIM) 1030 to interface with a SIM card, a boot rom 1035 to hold boot code for execution by cores 1006 and 1007 to initialize and boot SOC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the disclosure described herein.

In addition, the computer SoC 1000 illustrates peripherals for communication, such as a Bluetooth module 1070, 3G modem 1075, GPS 1080, and Wi-Fi 1085. Note as stated above, a UE includes a radio for communication. As a result, these peripheral communication modules are not all required. However, in a UE, some form a radio for external communication is to be included.

Figure 11:
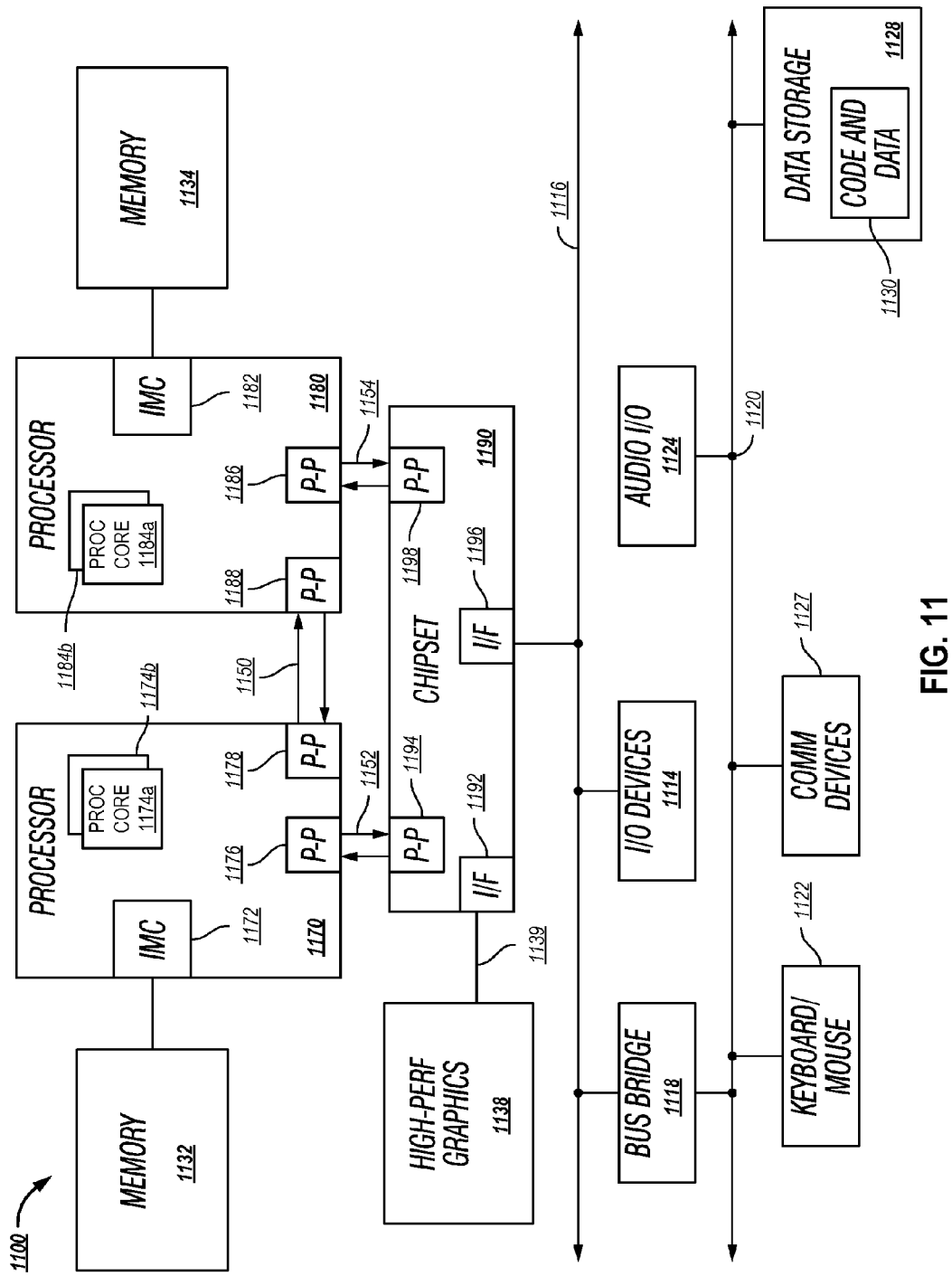
FIG. 11 is a block diagram of a computer system, according to one embodiment of the present disclosure.

FIG. 11 is a block diagram of a multiprocessor system 1100 in accordance with an implementation. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processing module 101 of FIG. 1. As shown in FIG. 11, each of processors 1170 and 1180 may be multicore processors, including first and second processor cores (i.e., processor cores 1174a and 1174b and processor cores 1184a and 1184b), although potentially many more cores may be present in the processors. A processor core may also be referred to as an execution core. The processors each may include hybrid write mode logics in accordance with an embodiment of the present. In one embodiment, each of processors 1170 and 1180 may include an FMA module (as illustrated in FIGS. 1 and 2) for performing FMA operations.

While shown with two processors 1170, 1180, it is to be understood that the scope of the present disclosure is not so limited. In other implementations, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, and 1198. Chipset 1190 may also exchange information with a high-performance graphics circuit 1138 via a high-performance graphics interface 1139.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, second bus 1120 may be a low pin count (LPC) bus. Various devices may be coupled to second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to second bus 1120. Note that other architectures are possible. For example, instead of the point-to-point architecture of FIG. 11, a system may implement a multi-drop bus or other such architecture.

Figure 12:
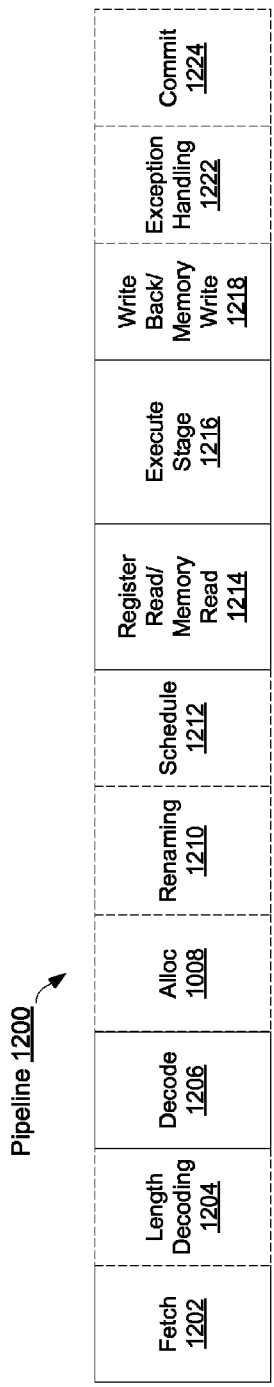
FIG. 12 is a block diagram illustrating an in-order pipeline and a register renaming stage, out-of-order issue/execution pipeline implemented by a processor core, according to one embodiment of the present disclosure.
Figure 13:
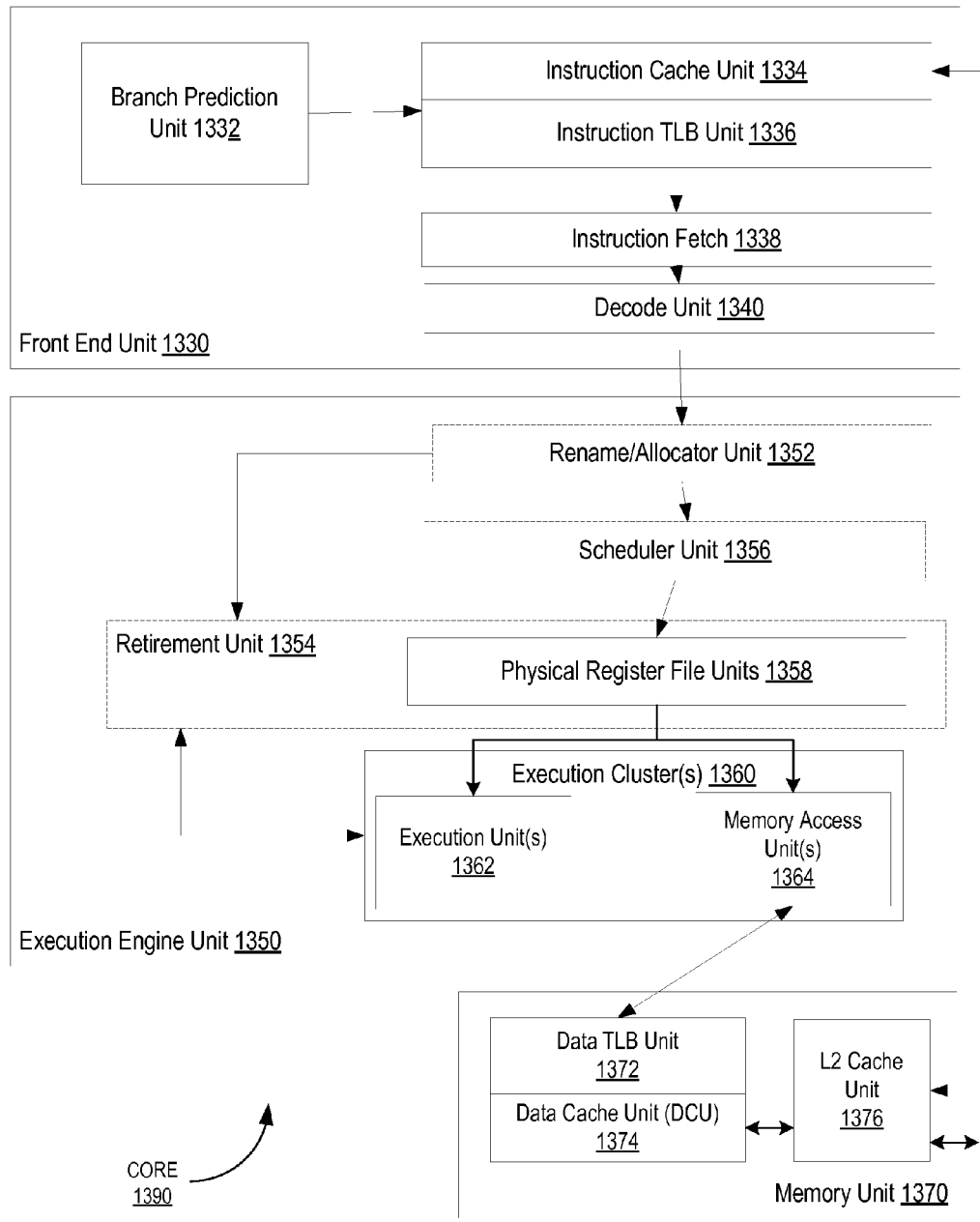
FIG. 13 is a block diagram illustrating an in-order architecture core and a register renaming logic, out-of-order issue/execution logic to be included in a processor, according to at least one embodiment of the disclosure.

FIG. 12 is a block diagram illustrating an in-order pipeline and a register renaming stage, out-of-order issue/execution pipeline implemented by core 1390 of FIG. 13 (which may be include in a processor). FIG. 12 is a block diagram illustrating an in-order architecture core and a register renaming logic, out-of-order issue/execution logic that may be included in a processor according to at least one embodiment of the invention. The solid lined boxes in FIG. 12 illustrate the in-order pipeline, while the dashed lined boxes illustrates the register renaming, out-of-order issue/execution pipeline. Similarly, the solid lined boxes in FIG. 12 illustrate the in-order architecture logic, while the dashed lined boxes illustrates the register renaming logic and out-of-order issue/execution logic. In FIG. 12, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1210, an execute stage 1216, a write back/memory write stage 1218, an exception handling stage 1222, and a commit stage 1224. In one embodiment, the execute state 1216 may use an FMA module (as illustrated in FIGS. 1 and 2) for performing FMA operations.

FIG. 13 is a block diagram illustrating an in-order architecture core and a register renaming logic, out-of-order issue/execution logic that may be included in a processor according to at least one embodiment of the disclosure. In FIG. 13, arrows denote a coupling between two or more units and the direction of the arrow indicates a direction of data flow between those units. FIG. 13 shows processor core 1390 including a front end unit 1330 coupled to an execution engine unit 1350, and both are coupled to a memory unit 1370.

The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1334 is further coupled to a level 2 (L2) cache unit 1376 in the memory unit 1370. The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1358 is overlapped by the retirement unit 1354 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1354 and the physical register file(s) unit(s) 1358 are coupled to the execution cluster(s) 1360. The execution cluster(s) 1360 includes a set of one or more execution units 162 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order. In one embodiment, the execution unit 1350 may include an FMA module (as illustrated in FIGS. 1 and 2) for performing FMA operations.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The L2 cache unit 1376 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1210; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 14:
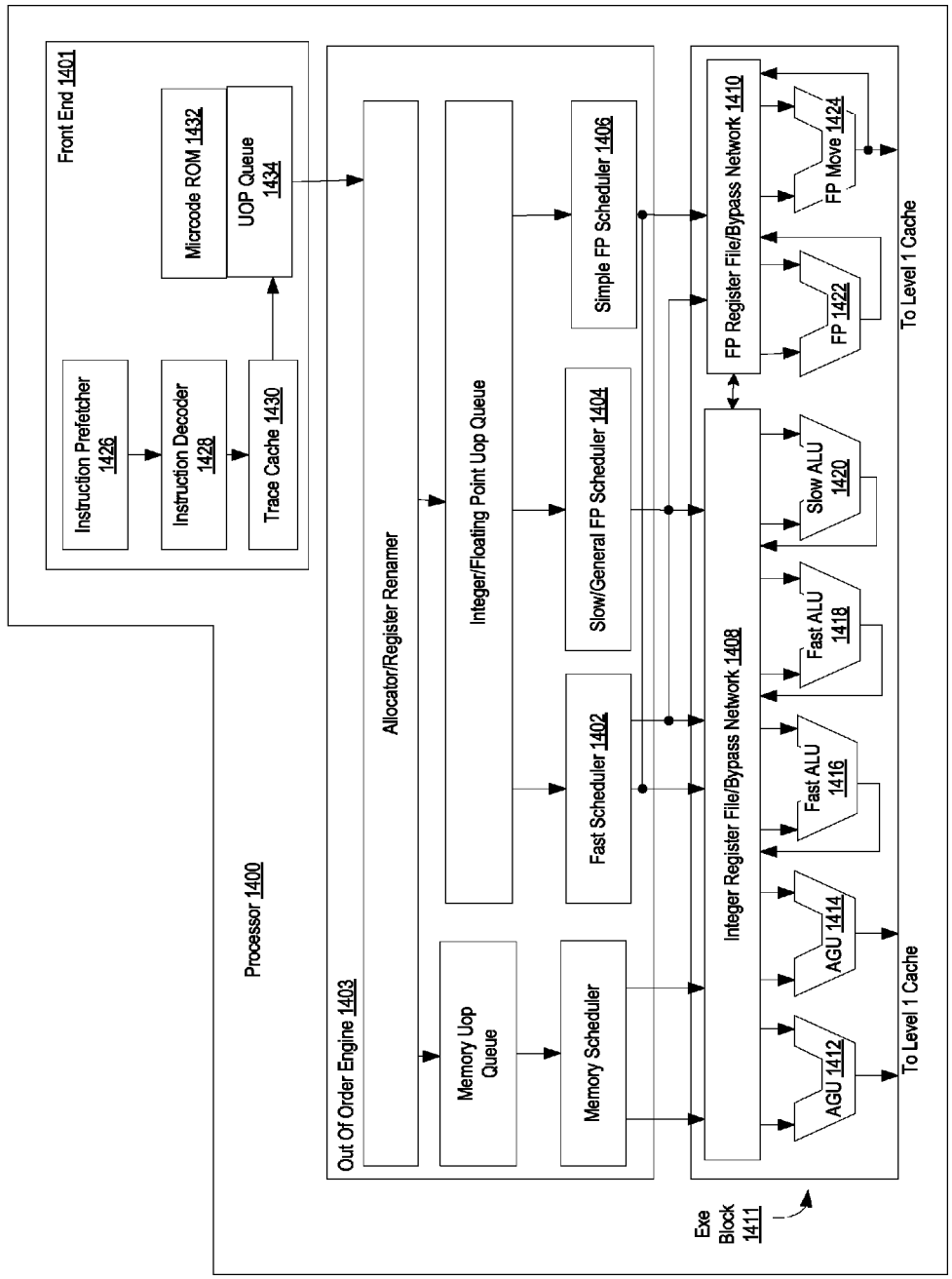
FIG. 14 is a block diagram of the micro-architecture for a processor that includes logic circuits to perform instructions, in accordance with one embodiment of the present disclosure.

FIG. 14 is a block diagram of the micro-architecture for a processor 1400 that includes logic circuits to perform instructions in accordance with one embodiment of the present invention. In some embodiments, an instruction in accordance with one embodiment can be implemented to operate on data elements having sizes of byte, word, double-word, quadword, etc., as well as datatypes, such as single and double precision integer and floating point datatypes. In one embodiment the in-order front end 1401 is the part of the processor 1400 that fetches instructions to be executed and prepares them to be used later in the processor pipeline. The front end 1401 may include several units. In one embodiment, the instruction prefetcher 1426 fetches instructions from memory and feeds them to an instruction decoder 1428 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1430 takes decoded uops and assembles them into program ordered sequences or traces in the uop queue 1434 for execution. When the trace cache 1430 encounters a complex instruction, the microcode ROM 1432 provides the uops needed to complete the operation.

Some instructions are converted into a single micro-op, whereas others need several micro-ops to complete the full operation. In one embodiment, if more than four micro-ops are needed to complete an instruction, the decoder 1428 accesses the microcode ROM 1432 to do the instruction. For one embodiment, an instruction can be decoded into a small number of micro ops for processing at the instruction decoder 1428. In another embodiment, an instruction can be stored within the microcode ROM 1432 should a number of micro-ops be needed to accomplish the operation. The trace cache 1430 refers to an entry point programmable logic array (PLA) to determine a correct micro-instruction pointer for reading the micro-code sequences to complete one or more instructions in accordance with one embodiment from the micro-code ROM 1432. After the microcode ROM 1432 finishes sequencing micro-ops for an instruction, the front end 1401 of the machine resumes fetching micro-ops from the trace cache 1430.

The out-of-order execution engine 1403 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1402, slow/general floating point scheduler 1404, and simple floating point scheduler 1406. The uop schedulers 1402, 1404, 1406, determine when a uop is ready to execute based on the readiness of their dependent input register operand sources and the availability of the execution resources the uops need to complete their operation. The fast scheduler 1402 of one embodiment can schedule on each half of the main clock cycle while the other schedulers can only schedule once per main processor clock cycle. The schedulers arbitrate for the dispatch ports to schedule uops for execution.

Register files 1408, 1410, sit between the schedulers 1402, 1404, 1406, and the execution units 1412, 1414, 1416, 1418, 1420, 1422, and 1424 in the execution block 1411. There is a separate register file 1408, 1410, for integer and floating point operations, respectively. Each register file 1408, 1410, of one embodiment also includes a bypass network that can bypass or forward just completed results that have not yet been written into the register file to new dependent uops. The integer register file 1408 and the floating point register file 1410 are also capable of communicating data with the other. For one embodiment, the integer register file 1408 is split into two separate register files, one register file for the low order 32 bits of data and a second register file for the high order 32 bits of data. The floating point register file 1410 of one embodiment has 128 bit wide entries because floating point instructions typically have operands from 64 to 128 bits in width.

The execution block 1411 contains the execution units 1412, 1414, 1416, 1418, 1420, 1422, 1424, where the instructions are actually executed. This section includes the register files 1408, 1410, that store the integer and floating point data operand values that the micro-instructions need to execute. The processor 1400 of one embodiment is comprised of a number of execution units: address generation unit (AGU) 1412, AGU 1414, fast ALU 1416, fast ALU 1418, slow ALU 1420, floating point ALU 1422, floating point move unit 1424. For one embodiment, the floating point execution blocks 1422, 1424, execute floating point, MMX, SIMD, and SSE, or other operations. The floating point ALU 1422 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 1416, 1418. The fast ALUs 1416, 1418, of one embodiment can execute fast operations with an effective latency of half a clock cycle. For one embodiment, most complex integer operations go to the slow ALU 1420 as the slow ALU 1420 includes integer execution hardware for long latency type of operations, such as a multiplier, shifts, flag logic, and branch processing. Memory load/store operations are executed by the AGUs 1412, 1414. For one embodiment, the integer ALUs 1416, 1418, 1420, are described in the context of performing integer operations on 64 bit data operands. In alternative embodiments, the ALUs 1416, 1418, 1420, can be implemented to support a variety of data bits including 16, 32, 128, 256, etc. Similarly, the floating point units 1422, 1424, can be implemented to support a range of operands having bits of various widths. For one embodiment, the floating point units 1422, 1424, can operate on 128 bits wide packed data operands in conjunction with SIMD and multimedia instructions. In one embodiment, the execution block 1411 may include an FMA module (as illustrated in FIGS. 1 and 2) for performing FMA operations.

In one embodiment, the uops schedulers 1402, 1404, 1406, dispatch dependent operations before the parent load has finished executing. As uops are speculatively scheduled and executed in processor 1400, the processor 1400 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 15:
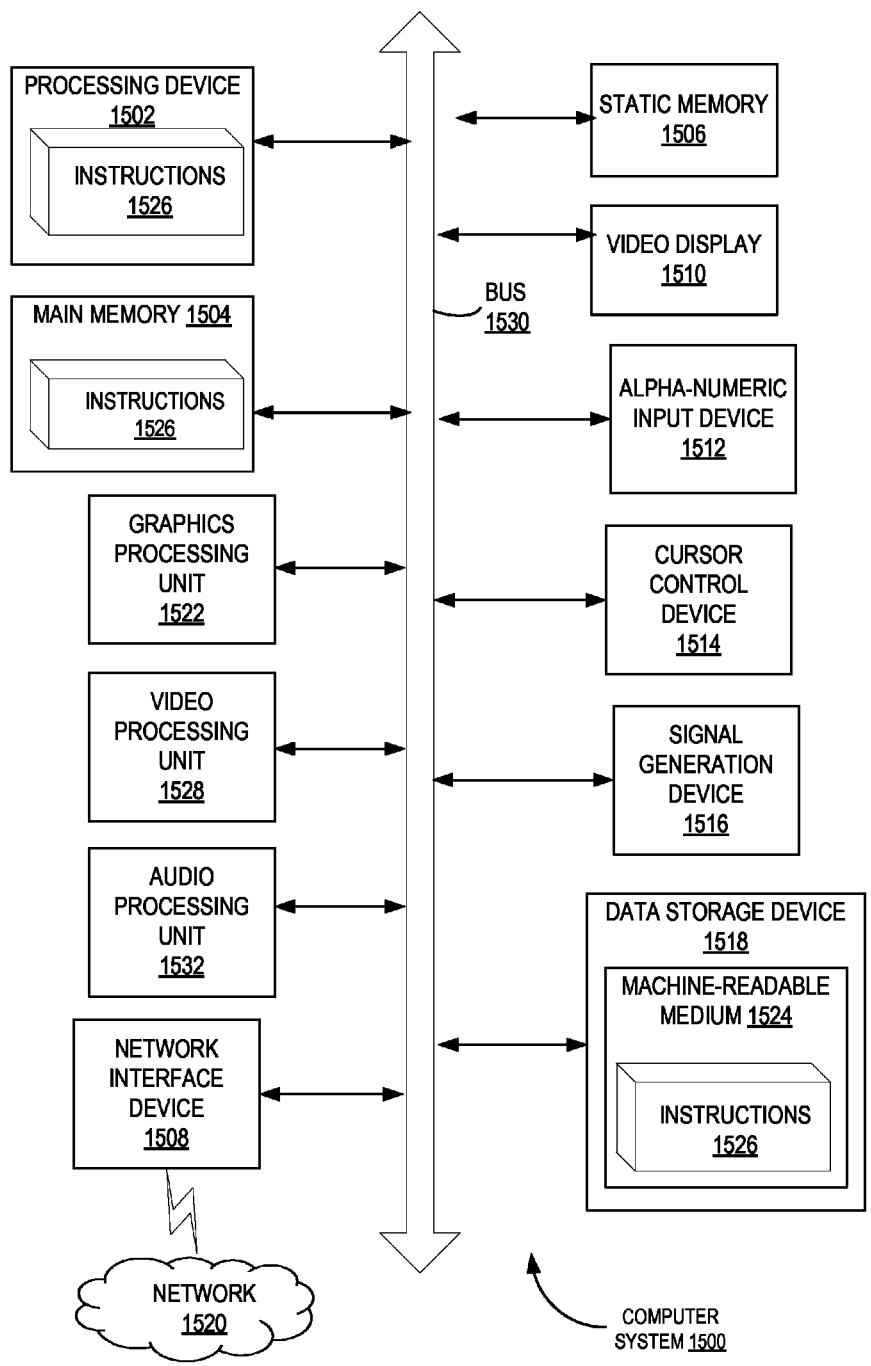
FIG. 15 illustrates a diagrammatic representation of a machine in the example form of a computer system within which a set of instructions, for causing the machine to perform any one or more of the methodologies discussed herein, may be executed.

FIG. 15 illustrates a diagrammatic representation of a machine in the example form of a computer system 1500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1500 includes a processing device 1502, a main memory 1504 (e.g., read-only memory (ROM), flash memory, dynamic random access memory (DRAM) (such as synchronous DRAM (SDRAM) or DRAM (RDRAM), etc.), a static memory 1506 (e.g., flash memory, static random access memory (SRAM), etc.), and a data storage device 1518, which communicate with each other via a bus 1530.

Processing device 1502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 may also be one or more special-purpose processing devices such as an application specific integrated circuit (ASIC), a field programmable gate array (FPGA), a digital signal processor (DSP), network processor, or the like. In one embodiment, processing device 1502 may include one or processing cores. The processing device 1502 is configured to execute the instructions 1526 for performing the operations discussed herein. In one embodiment, the processing device 1502 may include an FMA module (as illustrated in FIGS. 1 and 2) for performing FMA operations.

The computer system 1500 may further include a network interface device 1508 communicably coupled to a network 1520. The computer system 1500 also may include a video display unit 1510 (e.g., a liquid crystal display (LCD) or a cathode ray tube (CRT)), an alphanumeric input device 1512 (e.g., a keyboard), a cursor control device 1514 (e.g., a mouse), a signal generation device 1516 (e.g., a speaker), or other peripheral devices. Furthermore, computer system 1500 may include a graphics processing unit 1522, a video processing unit 1528, and an audio processing unit 1532. In another embodiment, the computer system 1500 may include a chipset (not illustrated), which refers to a group of integrated circuits, or chips, that are designed to work with the processing device 1502 and controls communications between the processing device 1502 and external devices. For example, the chipset may be a set of chips on a motherboard that links the processing device 1502 to very high-speed devices, such as main memory 1504 and graphic controllers, as well as linking the processing device 1502 to lower-speed peripheral buses of peripherals, such as USB, PCI or ISA buses.

The data storage device 1518 may include a computer-readable storage medium 1524 on which is stored instructions 1526 embodying any one or more of the methodologies of functions described herein. The instructions 1526 may also reside, completely or at least partially, within the main memory 1504 and/or within the processing device 1502 during execution thereof by the computer system 1500; the main memory 1504 and the processing device 1502 also constituting computer-readable storage media.

The computer-readable storage medium 1524 may also be used to store instructions 1526 utilizing the FMA module, such as described with respect to FIGS. 1 and 2, and/or a software library containing methods that call the above applications. While the computer-readable storage medium 1524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a method comprising multiplying a first floating point number with a second floating point number to obtain a product, generating a bit mask, and adding, by an adder, the product with a third floating point number based on the bit mask to generate a result, wherein the adder has a length less than 3*N and wherein N comprises a number of bits of one or more of the first floating point number, the second floating point number, or the third floating point number.

Example 2 may optionally extend the subject matter of example 1. In example 2 the first floating point number comprises a first mantissa term (M1) and a first exponent term (E1), wherein the second floating point number comprises a second mantissa term (M2) and a second exponent term (E2), and wherein the third floating point number comprises a third mantissa term (M3) and a third exponent term (E3).

Example 3 may optionally extend the subject matter of any of examples 1-2. In example 3, the method further comprises determining whether the third exponent term is greater than a sum of the first exponent term and the second exponent term and right shifting the third mantissa term by a second number of positions, wherein the second number is equal to E1–E2–E3.

Example 4 may optionally extend the subject matter of any of examples 1-3. In example 4, the bit mask comprises a sequence of bits that has a second length equal to N.

Example 5 may optionally extend the subject matter of any of examples 1-4. In example 5, a first number of most significant bits in the bit mask are set to zero and wherein the first number is equal to E1–E2–E3.

Example 6 may optionally extend the subject matter of any of examples 1-5. In example 6, adding the third floating point number with the third floating point based on the bit mask comprises performing a logical OR operation on the third mantissa term and the bit mask to obtain a first bit value, and performing a logical AND operation on the third mantissa term and an inverse of the bit mask to obtain a second bit value.

Example 7 may optionally extend the subject matter of any of examples 1-6. In example 7, adding the third floating point number with the third floating point based on the bit mask further comprises determining whether adding the product with the third floating point number results in a carry, performing a second logical OR operation on the first bit value and a shifted sum of the third floating point number with the product when adding the product with the third floating point number results in the carry, and performing the second logical OR operation on the second bit value and the shifted sum of the third floating point number with the product when adding the product with the third floating point number does not result in the carry.

Example 8 may optionally extend the subject matter of any of examples 1-7. In example 8, generating a second mask and left shifting the result based on the second mask, wherein the left shifting denormalizes the result when an underflow occurs and wherein the left shifting normalizes the result when no underflow occurs.

Example 9 is a data processing system comprising a set of registers to store a first floating point number, a second floating point number, and a third floating number, an execution unit coupled to the set of registers and comprising an adder, the execution unit to multiply the first floating point number with the second floating point number to obtain a product, generate a bit mask, and add, using the adder, the product with the third floating point number based on the bit mask to generate a result, wherein the adder has a length less than 3*N and wherein N comprises a number of bits of one or more of the first floating point number, the second floating point number, or the third floating point number.

Example 10 may optionally extend the subject matter of examples 9. In example 10, the first floating point number comprises a first mantissa term (M1) and a first exponent term (E1), wherein the second floating point number comprises a second mantissa term (M2) and a second exponent term (E2), and wherein the third floating point number comprises a third mantissa term (M3) and a third exponent term (E3).

Example 11 may optionally extend the subject matter of any of examples 9-10. In example 11, the execution unit is further to determine whether the third exponent term is greater than a sum of the first exponent term and the second exponent term, and right shift the third mantissa term by a second number of positions, wherein the second number is equal to E1–E2–E3.

Example 12 may optionally extend the subject matter of any of examples 9-11. In example 12, the bit mask comprises a sequence of bits that has a second length equal to N.

Example 13 may optionally extend the subject matter of any of examples 9-12. In example 13, a first number of most significant bits in the bit mask are set to zero and wherein the first number is equal to E1-E2-E3.

Example 14 may optionally extend the subject matter of any of examples 9-13. In example 14, adding the third floating point number with the third floating point based on the bit mask comprises performing a logical OR operation on the third mantissa term and the bit mask to obtain a first bit value, and performing a logical AND operation on the third mantissa term and an inverse of the bit mask to obtain a second bit value.

Example 15 may optionally extend the subject matter of any of examples 9-14. In example 15, adding the third floating point number with the third floating point based on the bit mask further comprises determining whether adding the product with the third floating point number results in a carry, performing a second logical OR operation on the first bit value and a shifted sum of the third floating point number with the product when adding the product with the third floating point number results in the carry, and performing the second logical OR operation on the second bit value and the shifted sum of the third floating point number with the product when adding the product with the third floating point number does not result in the carry.

Example 16 may optionally extend the subject matter of any of examples 9-15. In example 16, the execution unit is further to generate a second mask, and left shift the result based on the second mask, wherein the left shift denormalizes the result when an underflow occurs and wherein the left shift normalizes the result when no underflow occurs.

Example 17 is a non-transitory machine-readable storage medium comprising data that, when accessed by a processor, cause the processor to perform operations comprising multiplying a first floating point number with a second floating point number to obtain a product, generating a bit mask, and adding, by an adder, the product with a third floating point number based on the bit mask to generate a result, wherein the adder has a length less than 3*N and wherein N comprises a number of bits of one or more of the first floating point number, the second floating point number, or the third floating point number.

Example 18 may optionally extend the subject matter of example 17. In example 18, the first floating point number comprises a first mantissa term (M1) and a first exponent term (E1), wherein the second floating point number comprises a second mantissa term (M2) and a second exponent term (E2), and wherein the third floating point number comprises a third mantissa term (M3) and a third exponent term (E3).

Example 19 may optionally extend the subject matter of any of examples 17-18. In example 19, the operations further comprise determining whether the third exponent term is greater than a sum of the first exponent term and the second exponent term, and right shifting the third mantissa term by a second number of positions, wherein the second number is equal to E1-E2-E3.

Example 20 may optionally extend the subject matter of any of examples 17-19. In example 20, the bit mask comprises a sequence of bits that has a second length equal to N.

Example 21 may optionally extend the subject matter of any of examples 17-20. In example 21, a first number of most significant bits in the bit mask are set to zero and wherein the first number is equal to E1-E2-E3.

Example 22 may optionally extend the subject matter of any of examples 17-21. In example 22, adding the third floating point number with the third floating point based on the bit mask comprises performing a logical OR operation on the third mantissa term and the bit mask to obtain a first bit value, and performing a logical AND operation on the third mantissa term and an inverse of the bit mask to obtain a second bit value.

Example 23 may optionally extend the subject matter of any of examples 17-22. In example 2,3 adding the third floating point number with the third floating point based on the bit mask further comprises determining whether adding the product with the third floating point number results in a carry, performing a second logical OR operation on the first bit value and a shifted sum of the third floating point number with the product when adding the product with the third floating point number results in the carry, and performing the second logical OR operation on the second bit value and the shifted sum of the third floating point number with the product when adding the product with the third floating point number does not result in the carry.

Example 24 may optionally extend the subject matter of any of examples 17-23. In example 24, the operations further comprise generating a second mask, and left shifting the result based on the second mask, wherein the left shifting denormalizes the result when an underflow occurs and wherein the left shifting normalizes the result when no underflow occurs.

Example 25 is an apparatus comprising means for multiplying a first floating point number with a second floating point number to obtain a product, means for generating a bit mask, and means for adding, by an adder, the product with a third floating point number based on the bit mask to generate a result, wherein the adder has a length less than 3*N and wherein N comprises a number of bits of one or more of the first floating point number, the second floating point number, or the third floating point number.

Example 26 may optionally extend the subject matter of example 25. In example 26, the first floating point number comprises a first mantissa term (M1) and a first exponent term (E1), wherein the second floating point number comprises a second mantissa term (M2) and a second exponent term (E2), and wherein the third floating point number comprises a third mantissa term (M3) and a third exponent term (E3).

Example 27 may optionally extend the subject matter of any of examples 25-26. In example 27, the apparatus further comprises means for determining whether the third exponent term is greater than a sum of the first exponent term and the second exponent term, and means for right shifting the third mantissa term by a second number of positions, wherein the second number is equal to E1-E2-E3.

Example 28 may optionally extend the subject matter of any of examples 25-27. In example 28, the bit mask comprises a sequence of bits that has a second length equal to N.

Example 29 may optionally extend the subject matter of any of examples 25-28. In example 29, a first number of most significant bits in the bit mask are set to zero and wherein the first number is equal to E1-E2-E3.

Example 30 may optionally extend the subject matter of any of examples 25-29. In example 30, adding the third floating point number with the third floating point based on the bit mask comprises performing a logical OR operation on the third mantissa term and the bit mask to obtain a first bit value, and performing a logical AND operation on the third mantissa term and an inverse of the bit mask to obtain a second bit value.

Example 31 may optionally extend the subject matter of any of examples 25-30. In example 31, adding the third floating point number with the third floating point based on the bit mask further comprises determining whether adding the product with the third floating point number results in a carry, performing a second logical OR operation on the first bit value and a shifted sum of the third floating point number with the product when adding the product with the third floating point number results in the carry, and performing the second logical OR operation on the second bit value and the shifted sum of the third floating point number with the product when adding the product with the third floating point number does not result in the carry.

Example 32 may optionally extend the subject matter of any of examples 25-31. In example 32, the apparatus further comprises means for generating a second mask, and means for left shifting the result based on the second mask, wherein the left shifting denormalizes the result when an underflow occurs and wherein the left shifting normalizes the result when no underflow occurs.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "multiplying," "generating," "adding," "determining," "shifting," "performing," "denormalizing," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
   multiplying a first mantissa term of a first floating point number with a second mantissa term of a second floating point number to obtain a product;
   performing, using an adder circuit, a first logical operation on a third mantissa term of a third floating point number and a first bit mask to obtain a first bit value, wherein the adder circuit supports an argument size of less than a pre-defined value proportional to a size of one of: the first mantissa term, the second mantissa term, or the third mantissa term;
   performing, using a logical AND circuit, a second logical operation on the third mantissa term and an inverse of the first bit mask to produce a second bit value;
   performing, using a logical OR circuit, a third logical operation on a sum of the product with the third mantissa term and one of: the first bit value incremented by one or the second bit value to generate a result; and
   responsive to detecting an underflow, denormalizing the result using a second bit mask.

2. The method of claim 1, wherein the first floating point number comprises the first mantissa term (M1) and a first exponent term (E1), wherein the second floating point number comprises the second mantissa term (M2) and a second exponent term (E2), and wherein the third floating point number comprises the third mantissa term (M3) and a third exponent term (E3).

3. The method of claim 2, wherein performing the first logical operation is preceded by performing one of: right shifting the third mantissa term by (E1+E2)−E3 bits or left shifting the third mantissa term by (E3−E1−E2) bits.

4. The method of claim 2, wherein performing the third logical operation is preceded by right shifting a pre-determined number of high bits of the sum by (E3−E1−E2) bits.

5. The method of claim 1, wherein the first logical operation is provided by a logical OR operation.

6. The method of claim 1, wherein the second logical operation is provided by a logical AND operation.

7. The method of claim 1, wherein third second logical operation is provided by a logical OR operation.

8. A system comprising:
   a set of registers to store a first floating point number, a second floating point number, and a third floating number;
   an execution unit comprising an adder circuit, the execution unit coupled to the set of registers, the execution unit to:
      multiply a first mantissa term of a first floating point number with a second mantissa term of a second floating point number to obtain a product;
      perform, using the adder circuit, a first logical operation on a third mantissa term of a third floating point number and a first bit mask to obtain a first bit value, wherein the adder circuit supports an argument size of less than a pre-defined value proportional to a size of one of: the first mantissa term, the second mantissa term, or the third mantissa term;
      perform, using a logical AND circuit, a second logical operation on the third mantissa term and an inverse of the first bit mask to produce a second bit value;
      perform, using a logical OR circuit, a third logical operation on a sum of the product with the third mantissa term and one of: the first bit value incremented by one or the second bit value to generate a result; and
      responsive to detecting an underflow, denormalize the result using a second bit mask.

9. The system of claim 8, wherein the first floating point number comprises the first mantissa term (M1) and a first exponent term (E1), wherein the second floating point number comprises the second mantissa term (M2) and a second exponent term (E2), and wherein the third floating point number comprises the third mantissa term (M3) and a third exponent term (E3).

10. The system of claim 9, wherein performing the first logical operation is preceded by performing one of: right shifting the third mantissa term by (E1+E2)−E3 bits or left shifting the third mantissa term by (E3−E1−E2) bits.

11. The system of claim 9, wherein performing the third logical operation is preceded by right shifting a pre-determined number of high bits of the sum by (E3−E1−E2) bits.

12. The system of claim 8, wherein the first logical operation is provided by a logical OR operation.

13. The system of claim 8, wherein the second logical operation is provided by a logical AND operation.

14. The system of claim 8, wherein third second logical operation is provided by a logical OR operation.

15. A non-transitory machine-readable storage medium comprising executable instructions that, when executed by a processor, cause the processor to:
   multiply a first mantissa term of a first floating point number with a second mantissa term of a second floating point number to obtain a product;
   perform, using an adder circuit, a first logical operation on a third mantissa term of a third floating point number and a first bit mask to obtain a first bit value, wherein the adder circuit supports an argument size of less than a pre-defined value proportional to a size of one of: the first mantissa term, the second mantissa term, or the third mantissa term;
   perform, using a logical AND circuit, a second logical operation on the third mantissa term and an inverse of the first bit mask to produce a second bit value;
   perform, using a logical OR circuit, a third logical operation on a sum of the product with the third mantissa term and one of: the first bit value incremented by one or the second bit value to generate a result; and
   responsive to detecting an underflow, denormalize the result using a second bit mask.

16. The non-transitory machine-readable storage medium of claim 15, wherein the first floating point number comprises the first mantissa term (M1) and a first exponent term (E1), wherein the second floating point number comprises the second mantissa term (M2) and a second exponent term (E2), and wherein the third floating point number comprises the third mantissa term (M3) and a third exponent term (E3).

17. The non-transitory machine-readable storage medium of claim 16, wherein performing the first logical operation is preceded by performing one of: right shifting the third mantissa term by (E1+E2)−E3 bits or left shifting the third mantissa term by (E3−E1−E2) bits.

18. The non-transitory machine-readable storage medium of claim 16, wherein performing the third logical operation c is preceded by right shifting a pre-determined number of high bits of the sum by (E3−E1−E2) bits.

* * * * *